US011798180B2

United States Patent
Yin et al.

(10) Patent No.: US 11,798,180 B2
(45) Date of Patent: Oct. 24, 2023

(54) GENERATING DEPTH IMAGES UTILIZING A MACHINE-LEARNING MODEL BUILT FROM MIXED DIGITAL IMAGE SOURCES AND MULTIPLE LOSS FUNCTION SETS

(71) Applicant: Adobe Inc., San Jose, CA (US)

(72) Inventors: Wei Yin, Adelaide (AU); Jianming Zhang, Campbell, CA (US); Oliver Wang, Seattle, WA (US); Simon Niklaus, San Jose, CA (US); Mai Long, Portland, OR (US); Su Chen, San Jose, CA (US)

(73) Assignee: Adobe Inc., San Jose, CA (US)

( * ) Notice: Subject to any disclaimer, the term of this patent is extended or adjusted under 35 U.S.C. 154(b) by 209 days.

(21) Appl. No.: 17/186,436

(22) Filed: Feb. 26, 2021

(65) Prior Publication Data

US 2022/0284613 A1     Sep. 8, 2022

(51) Int. Cl.
| | |
|---|---|
| *G06T 7/50* | (2017.01) |
| *G06T 7/593* | (2017.01) |
| *G06T 7/30* | (2017.01) |
| *G06T 7/13* | (2017.01) |
| *G06T 7/143* | (2017.01) |
| *G06T 7/521* | (2017.01) |

(52) U.S. Cl.
CPC .................. *G06T 7/50* (2017.01); *G06T 7/13* (2017.01); *G06T 7/143* (2017.01); *G06T 7/30* (2017.01); *G06T 7/521* (2017.01); *G06T 7/593* (2017.01); *G06T 2207/10028* (2013.01); *G06T 2207/20081* (2013.01); *G06T 2207/20084* (2013.01)

(58) Field of Classification Search
CPC .. G06T 7/50; G06T 7/521; G06T 7/55; G06T 7/593; G06T 7/596; G06T 2207/20081; G06T 2207/20084; G06T 2207/10028; G06T 7/13; G06T 7/143; G06T 7/30; G06N 3/02–0985
See application file for complete search history.

(56) References Cited

U.S. PATENT DOCUMENTS

| | | | |
|---|---|---|---|
| 2021/0150278 A1* | 5/2021 | Dudzik | G01S 17/931 |
| 2021/0183083 A1* | 6/2021 | Yan | G06N 3/045 |

OTHER PUBLICATIONS

Yin, Wei, et al. "Learning to Recover 3D Scene Shape from a Single Image." arXiv preprint arXiv:2012.09365v1 (2020). (Year: 2020).*

(Continued)

*Primary Examiner* — Ian L Lemieux
(74) *Attorney, Agent, or Firm* — Keller Preece PLLC

(57) ABSTRACT

This disclosure describes one or more implementations of a depth prediction system that generates accurate depth images from single input digital images. In one or more implementations, the depth prediction system enforces different sets of loss functions across mix-data sources to generate a multi-branch architecture depth prediction model. For instance, in one or more implementations, the depth prediction model utilizes different data sources having different granularities of ground truth depth data to robustly train a depth prediction model. Further, given the different ground truth depth data granularities from the different data sources, the depth prediction model enforces different combinations of loss functions including an image-level normalized regression loss function and/or a pair-wise normal loss among other loss functions.

19 Claims, 16 Drawing Sheets

(56) References Cited

OTHER PUBLICATIONS

Xian, Ke, et al. "Structure-Guided Ranking Loss for Single Image Depth Prediction." 2020 IEEE/CVF Conference on Computer Vision and Pattern Recognition (CVPR). IEEE, 2020. (Year: 2020).*

Gurram, Akhil, et al. "Monocular depth estimation by learning from heterogeneous datasets." 2018 IEEE Intelligent Vehicles Symposium (IV). IEEE, 2018. (Year: 2018).*

Ranftl, René, et al. "Towards robust monocular depth estimation: Mixing datasets for zero-shot cross-dataset transfer." IEEE transactions on pattern analysis and machine intelligence (2020). (Year: 2020).*

Iro Armeni, Sasha Sax, Amir R Zamir, and Silvio Savarese. Joint 2d-3d-semantic data for indoor scene understanding. arXiv preprint arXiv:1702.01105, 2017.

Jonathan T Barron and Jitendra Malik. Shape, illumination, and reflectance from shading. IEEE Trans. Pattern Anal. Mach. Intell., 37(8):1670-1687, 2014.

Jiawang Bian, Zhichao Li, Naiyan Wang, Huangying Zhan, Chunhua Shen, Ming-Ming Cheng, and Ian Reid. Unsupervised scale-consistent depth and ego-motion learning from monocular video. In Proc. Advances in Neural Inf. Process. Syst., pp. 35-45, 2019.

D. J. Butler, J. Wulff, G. B. Stanley, and M. J. Black. A naturalistic open source movie for optical flow evaluation. In Proc. Eur. Conf. Comp. Vis., pp. 611-625. Springer, 2012.

Liang-Chieh Chen, Yukun Zhu, George Papandreou, Florian Schroff, and Hartwig Adam. Encoder-decoder with atrous separable convolution for semantic image segmentation. In Proc. Eur. Conf. Comp. Vis., 2018.

Weifeng Chen, Zhao Fu, Dawei Yang, and Jia Deng. Single-image depth perception in the wild. In Proc. Advances in Neural Inf. Process. Syst., pp. 730-738, 2016.

Weifeng Chen, Shengyi Qian, and Jia Deng. Learning single-image depth from videos using quality assessment networks. In Proc. IEEE Conf. Comp. Vis. Patt. Recogn., pp. 5604-5613, 2019.

Weifeng Chen, Shengyi Qian, David Fan, Noriyuki Kojima, Max Hamilton, and Jia Deng. Oasis: A Targe-scale dataset for single image 3d in the wild. In Proc. IEEE Conf. Comp. Vis. Patt. Recogn., pp. 679-688, 2020.

Angela Dai, Angel X Chang, Manolis Savva, Maciej Halber, Thomas Funkhouser, and Matthias Nießner. Scannet: Richly-annotated 3d reconstructions of indoor scenes. In Proc. IEEE Conf. Comp. Vis. Patt. Recogn., pp. 5828-5839, 2017.

Jonathan Deutscher, Michael Isard, and John MacCormick. Automatic camera calibration from a single manhattan image. In Proc. Eur. Conf. Comp. Vis., pp. 175-188. Springer, 2002.

David Eigen, Christian Puhrsch, and Rob Fergus. Depth map prediction from a single image using a multi-scale deep network. In Proc. Advances in Neural Inf. Process. Syst., pp. 2366-2374, 2014.

Jose M Facil, Benjamin Ummenhofer, Huizhong Zhou, Luis Montesano, Thomas Brox, and Javier Civera. Camconvs: camera-aware multi-scale convolutions for single-view depth. In Proc. IEEE Conf. Comp. Vis. Patt. Recogn., pp. 11826-11835, 2019.

Keinosuke Fukunaga. Introduction to Statistical Pattern Recognition. Elsevier, 2013 part 1.

Keinosuke Fukunaga. Introduction to Statistical Pattern Recognition. Elsevier, 2013 part 2.

Keinosuke Fukunaga. Introduction to Statistical Pattern Recognition. Elsevier, 2013 part 3.

Keinosuke Fukunaga. Introduction to Statistical Pattern Recognition. Elsevier, 2013 part 4.

Salvador Garcia, Julian Luengo, and Francisco Herrera. Data preprocessing in data mining. Springer, 2015.

Andreas Geiger, Philip Lenz, and Raquel Urtasun. Are we ready for autonomous driving? the kitti vision benchmark suite. In Proc. IEEE Conf. Comp. Vis. Patt. Recogn., pp. 3354-3361. IEEE, 2012.

Clement Godard, Oisin Mac Aodha, Michael Firman, and Gabriel J. Brostow. Digging into self-supervised monocular depth prediction. In Proc. IEEE Int. Conf. Comp. Vis., 2019.

Richard Hartley and Andrew Zisserman. Multiple view geometry in computer vision. Cambridge university press, 2003.

Kaiming He, Xiangyu Zhang, Shaoqing Ren, and Jian Sun. Deep residual learning for image recognition. In Proc. IEEE Conf. Comp. Vis. Patt. Recogn., pp. 770-778, 2016.

Yannick Hold-Geoffroy, Kalyan Sunkavalli, Jonathan Eisenmann, Matthew Fisher, Emiliano Gambaretto, Sunil Hadap, and Jean-Francois Lalonde. A perceptual measure for deep single image camera calibration. In Proc. IEEE Conf. Comp. Vis. Patt. Recogn., pp. 2354-2363, 2018.

Yiwen Hua, Puneet Kohli, Pritish Uplavikar, Anand Ravi, Saravana Gunaseelan, Jason Orozco, and Edward Li. Holopix50k: A large-scale in-the-wild stereo image dataset. In IEEE Conf. Comput. Vis. Pattern Recog. Worksh., Jun. 2020.

E. Ilg, N. Mayer, T. Saikia, M. Keuper, A. Dosovitskiy, and T. Brox. Flownet 2.0: Evolution of optical flow estimation with deep networks. In Proc. IEEE Conf. Comp. Vis. Patt. Recogn., 2017.

Olga A Karpenko and John Hughes. Smoothsketch: 3d free-form shapes from complex sketches. In ACM. T. Graph. (SIGGRAPH), pp. 589-598. 2006.

Youngjung Kim, Hyungjoo Jung, Dongbo Min, and Kwanghoon Sohn. Deep monocular depth estimation via integration of global and local predictions. IEEE Trans. Image Process., 27(8):4131-4144, 2018.

Tobias Koch, Lukas Liebel, Friedrich Fraundorfer, and Marco Korner. Evaluation of CNN-based single-image depth estimation methods. In Eur. Conf. Comput. Vis. Worksh., pp. 331-348, 2018.

Manuel Lang, Alexander Hornung, Oliver Wang, Steven Poulakos, Aljoscha Smolic, and Markus Gross. Nonlinear disparity mapping for stereoscopic 3d. ACM Trans. Graph., 29(4):1-10, 2010.

Zhengqi Li and Noah Snavely. Megadepth: Learning single-view depth prediction from internet photos. In Proc. IEEE Conf. Comp. Vis. Patt. Recogn., pp. 2041-2050, 2018.

Fayao Liu, Chunhua Shen, Guosheng Lin, and Ian Reid. Learning depth from single monocular images using deep convolutional neural fields. IEEE Trans. Pattern Anal. Mach. Intell., 38(10):2024-2039, 2015.

Yifan Liu, Bohan Zhuang, Chunhua Shen, Hao Chen, and Wei Yin. Training compact neural networks via auxiliary overparameterization. arXiv preprint arXiv:1909.02214, 2019.

Zhijian Liu, Haotian Tang, Yujun Lin, and Song Han. Point-voxel cnn for efficient 3d deep learning. In Proc. Advances in Neural Inf. Process. Syst., 2019.

Simon Niklaus, Long Mai, Jimei Yang, and Feng Liu. 3d ken burns effect from a single image. ACM Trans. Graph., 38(6):184:1-184:15, 2019.

Emmanuel Prados and Olivier Faugeras. Shape from shading: a well-posed problem? In Proc. IEEE Conf. Comp. Vis. Patt. Recogn., vol. 2, pp. 870-877. IEEE, 2005.

Rene Ranftl, Katrin Lasinger, David Hafner, Konrad Schindler, and Vladlen Koltun. Towards robust monocular depth estimation: Mixing datasets for zero-shot cross-dataset transfer. IEEE Trans. Pattern Anal. Mach. Intell., 2020.

Shunsuke Saito, Zeng Huang, Ryota Natsume, Shigeo Morishima, Angjoo Kanazawa, and Hao Li. Pifu: Pixel-aligned implicit function for high-resolution clothed human digitization. In Proc. IEEE Conf. Comp. Vis. Patt. Recogn., pp. 2304-2314, 2019.

Shunsuke Saito, Tomas Simon, Jason Saragih, and Hanbyul Joo. Pifuhd: Multi-level pixel-aligned implicit function for high-resolution 3d human digitization. In Proc. IEEE Conf. Comp. Vis. Patt. Recogn., pp. 84-93, 2020.

Ashutosh Saxena, Min Sun, and Andrew Y Ng. Make3d: Learning 3d scene structure from a single still image. IEEE Trans. Pattern Anal. Mach. Intell., 31(5):824-840, 2008.

Thomas Schops, Johannes L Schonberger, Silvano Galliani, Torsten Sattler, Konrad Schindler, Marc Pollefeys, and Andreas Geiger. A multi-view stereo benchmark with high-resolution images and multi-camera videos. In Proc. IEEE Conf. Comp. Vis. Patt. Recogn., pp. 3260-3269, 2017.

Nathan Silberman, Derek Hoiem, Pushmeet Kohli, and Rob Fergus. Indoor segmentation and support inference from rgbd images. In Proc. Eur. Conf. Comp. Vis., pp. 746-760. Springer, 2012.

(56) References Cited

OTHER PUBLICATIONS

Dalwinder Singh and Birmohan Singh. Investigating the impact of data normalization on classification performance. Ap-plied Soft Computing, p. 105524, 2019.

Igor Vasiljevic, Nick Kolkin, Shanyi Zhang, Ruotian Luo, Haochen Wang, Falcon Z Dai, Andrea F Daniele, Mohammadreza Mostajabi, Steven Basart, Matthew R Walter, et al. Diode: A dense indoor and outdoor depth dataset. arXiv preprint arXiv:1908.00463, 2019.

Chaoyang Wang, Simon Lucey, Federico Perazzi, and Oliver Wang. Web stereo video supervision for depth prediction from dynamic scenes. In Int. Conf. 3D. Vis., pp. 348-357. IEEE, 2019.

Lijun Wang, Jianming Zhang, Oliver Wang, Zhe Lin, and Huchuan Lu. Sdc-depth: Semantic divide-and-conquer network for monocular depth estimation. In Proc. IEEE Conf. Comp. Vis. Patt. Recogn., pp. 541-550, 2020.

Nanyang Wang, Yinda Zhang, Zhuwen Li, Yanwei Fu, Wei Liu, and Yu-Gang Jiang. Pixel2mesh: Generating 3d mesh models from single RGB images. In Proc. Eur. Conf. Comp. Vis., pp. 52-67, 2018.

Xinlong Wang, Wei Yin, Tao Kong, Yuning Jiang, Lei Li, and Chunhua Shen. Task-aware monocular depth estimation for 3d object detection. In Proc. AAAI Conf. Artificial Intell., 2020.

Scott Workman, Connor Greenwell, Menghua Zhai, Ryan Baltenberger, and Nathan Jacobs. Deepfocal: A method for direct focal length estimation. In Proc. IEEE Int. Conf. Image Process., pp. 1369-1373. IEEE, 2015.

Jiajun Wu, Chengkai Zhang, Xiuming Zhang, Zhoutong Zhang, William Freeman, and Joshua Tenenbaum. Learning shape priors for single-view 3d completion and reconstruction. In Proc. Eur. Conf. Comp. Vis., pp. 646-662, 2018.

Ke Xian, Chunhua Shen, Zhiguo Cao, Hao Lu, Yang Xiao, Ruibo Li, and Zhenbo Luo. Monocular relative depth perception with web stereo data supervision. In Proc. IEEE Conf. Comp. Vis. Patt. Recogn., pp. 311-320, 2018.

Ke Xian, Jianming Zhang, Oliver Wang, Long Mai, Zhe Lin, and Zhiguo Cao. Structure-guided ranking loss for single image depth prediction. In Proc. IEEE Conf. Comp. Vis. Patt. Recogn., pp. 611-620, 2020.

Jianxiong Xiao, Krista A Ehinger, Aude Oliva, and Antonio Torralba. Recognizing scene viewpoint using panoramic place representation. In Proc. IEEE Conf. Comp. Vis. Patt. Recogn., pp. 2695-2702. IEEE, 2012.

Saining Xie, Ross Girshick, Piotr Dollar, Zhuowen Tu, and Kaiming He. Aggregated residual transformations for deep neural networks. In Proc. IEEE Conf. Comp. Vis. Patt. Recogn., pp. 1492-1500, 2017.

Wei Yin, Yifan Liu, Chunhua Shen, and Youliang Yan. Enforcing geometric constraints of virtual normal for depth prediction. In Proc. IEEE Int. Conf. Comp. Vis., 2019.

Wei Yin, Xinlong Wang, Chunhua Shen, Yifan Liu, Zhi Tian, Songcen Xu, Changming Sun, and Dou Renyin. Diversedepth: Affine-invariant depth prediction using diverse data. arXiv preprint arXiv:2002.00569, 2020.

Amir Zamir, Alexander Sax, , William Shen, Leonidas Guibas, Jitendra Malik, and Silvio Savarese. Taskonomy: Disentangling task transfer learning. In Proc. IEEE Conf. Comp. Vis. Patt. Recogn. IEEE, 2018.

Feihu Zhang, Victor Prisacariu, Ruigang Yang, and Philip Torr. Ga-net: Guided aggregation net for end-to-end stereo matching. In Proc. IEEE Conf. Comp. Vis. Patt. Recogn., pp. 185-194, 2019.

Zhengyou Zhang. A flexible new technique for camera calibration. IEEE Trans. Pattern Anal. Mach. Intell., 22(11):1330-1334, 2000.

\* cited by examiner

1000

Generating A First Set Of Predicted Depth Images And A Second Set Of Predicted Depth Images From Different Sources *1010*

Determining A First Measure Of Loss Utilizing A First Loss Function *1020*

Determining A Second Measure Of Loss Utilizing A Second Loss Function *1030*

Tuning The Depth Prediction Learning Model Utilizing The Measure Of Losses *1040*

Building A Depth Prediction Machine-Learning Model Utilizing An Image-Level Normalized Regression Loss *1100*

Normalizing A Ground Truth Depth Image *1110*

Trimming The Normalized Ground Truth Depth Image *1120*

Generating A Predicted Depth Image From A Digital Image *1130*

Generating Image-Level Normalized Regression Loss Based On The Trimmed Ground Truth Depth Image And The Predicted Depth Image *1140*

Tuning The Depth Prediction Model Utilizing The Image-Level Normalized Regression Loss *1150*

*Fig. 11*

GENERATING DEPTH IMAGES UTILIZING A MACHINE-LEARNING MODEL BUILT FROM MIXED DIGITAL IMAGE SOURCES AND MULTIPLE LOSS FUNCTION SETS

BACKGROUND

Recent years have seen significant improvements in hardware and software platforms for training and utilizing machine-learning models. For instance, many machine-learning methods have achieved promising performance in areas such as image editing. Notwithstanding these improvements, conventional systems continue to suffer from several problems with regard to the accuracy and flexibility of computing device operations, and in particular, with respect to generating depth maps from non-stereo images found in the wild. Further, while some conventional systems are able to create depth maps generalized to diverse scenes, their depth maps do not recover accurate and high-quality geometric structures. Accordingly, these along with additional problems and issues exist in current systems that generate digital depth images.

BRIEF SUMMARY

Implementations of the present disclosure provide benefits and/or solve one or more of the foregoing or other problems in the art with systems, non-transitory computer-readable media, and methods that accurately, flexibly, and efficiently generate and utilize a depth prediction machine-learning model to generate depth images (e.g., depth maps and inverse depth maps) from non-stereo images. To illustrate, in various implementations, the disclosed systems generate a depth prediction model trained from ground truth digital image sets from multiple data sources having different granularities of ground truth depth data. In addition, in one or more implementations, the disclosed systems train the depth prediction model utilizing different loss function combinations corresponding to different levels of available ground truth depth data. For example, for high-quality ground truth depth images having precise depth distances for each point, the disclosed systems utilize an image-level normalized regression loss function and/or a pair-wise normal loss function, along with other loss functions. Moreover, for ground truth depth images having minimal depth data, the disclosed systems select a different set of loss functions. In addition, the disclosed systems can utilize a unique multi-channel architecture to modify internal parameters of the depth prediction model using different ground truth depth images with different sources. By enforcing different losses for the mixed-data digital image sources within this architecture, the disclosed systems can generate a robust, diverse, and accurate monocular depth prediction model that generates depth images from single input digital images.

The following description sets forth additional features and advantages of one or more implementations of the disclosed systems, computer-readable media, and methods.

BRIEF DESCRIPTION OF THE DRAWINGS

The detailed description provides one or more implementations with additional specificity and detail through the use of the accompanying drawings, as briefly described below.

FIG. 10 illustrates a flowchart of a series of acts for generating depth images utilizing depth prediction machine-learning models in accordance with one or more implementations.

FIG. 11 illustrates a flowchart of a series of acts for building a depth prediction machine-learning model utilizing an image-level normalized regression loss in accordance with one or more implementations.

DETAILED DESCRIPTION

Figure 1:
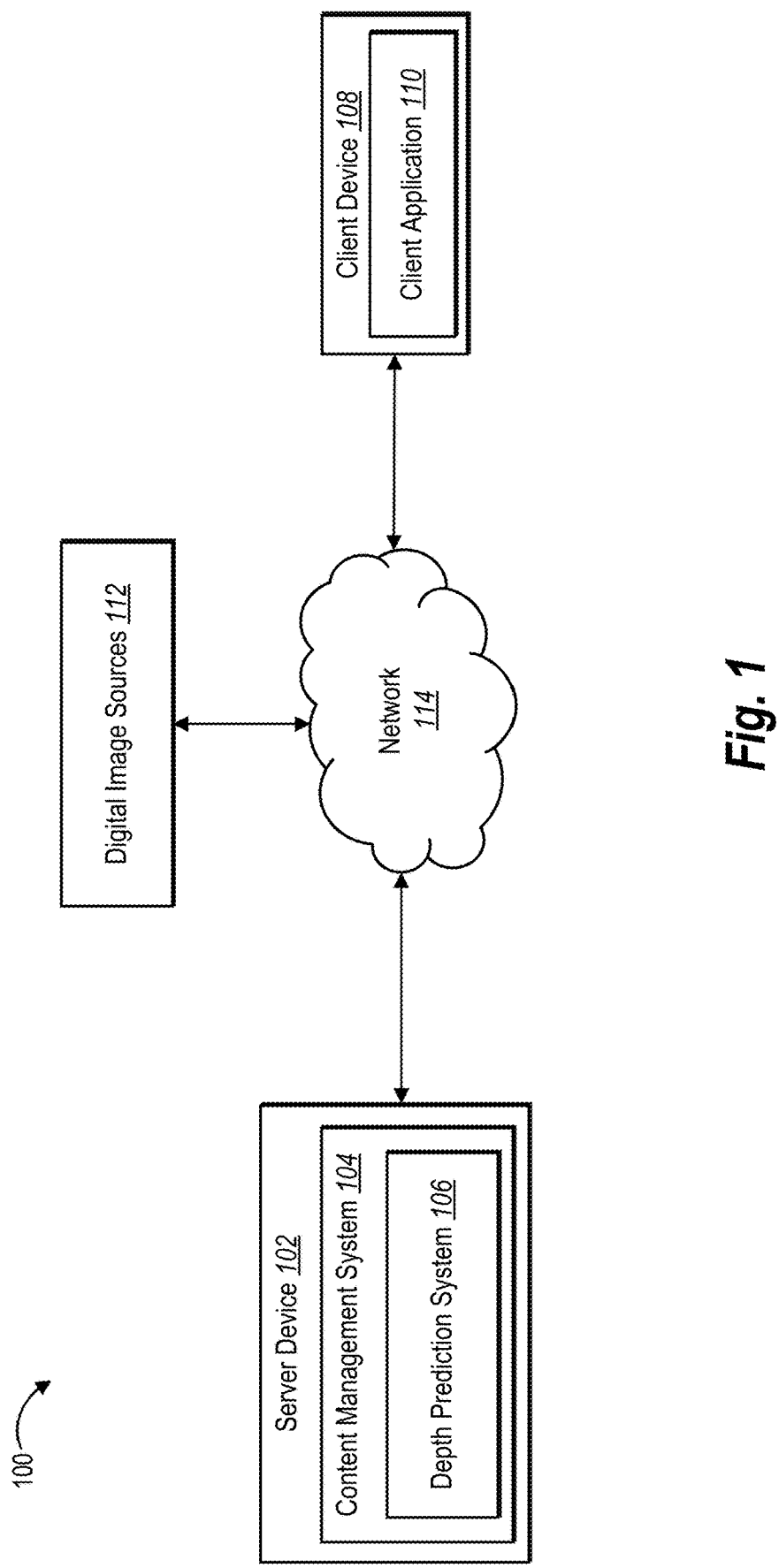
FIG. 1 illustrates a schematic diagram of a system environment in which the depth prediction system operates in accordance with one or more implementations.

This disclosure describes one or more implementations of a depth prediction system (e.g., a machine-learning depth image prediction system) that generates accurate depth images from single input digital images. For example, in various implementations, the depth prediction system enforces different supervisions across multi-data sources to generate a multi-branch architecture depth prediction model (e.g., a depth prediction machine-learning model). Additionally, the depth prediction model may utilize data sources having different granularities of ground truth depth data to train a depth prediction model. For each data source, the depth prediction model can enforce a different combination of loss functions. For instance, in various implementations, for sources that provide highly granular ground truth depth data, the depth prediction system enforces multiple loss functions, such as image-level normalized regression loss and pair-wise normal loss among other loss functions. For sources that provide less granular ground truth depth data, the depth prediction system enforces a different set of loss functions. In this manner, the depth prediction system can train a depth prediction model that accurately generates depth images (e.g., depth maps and inverse depth maps) for input digital images found in the wild and lacking depth data.

As mentioned above, in various implementations, the depth prediction system generates a depth prediction model from ground truth digital image sets (or simply "image sets") of mixed-data digital image sources. In a number of implementations, an image set includes digital images and corresponding ground truth depth images that provide captured depth data of the digital images.

In many implementations, image sets from different sources include different levels of captured depth data in their ground truth depth images. Indeed, different image sets are created at different sources that provide different granularities of captured depth data for ground truth depth images. For example, an image set from a high-quality data source includes LiDAR images and/or three-dimensional point clouds as the ground truth depth images. As another example, an image set from a mid-quality data source includes calibrated stereo-image-based depth data. Further, an image set from a low-quality data source includes non-calibrated depth data.

In various implementations, during the model training phase, the depth prediction system utilizes the depth prediction model to generate predicted depth images from digital images of the image sets (e.g., input images). For instance, the depth prediction model encodes depth features from the input images into feature vectors. Further, the depth prediction model decodes the feature vector into predicted depth images. In some implementations, the depth prediction model includes multiple output paths that generate different depth image types (e.g., depth maps and inverse depth maps).

As also described above, the depth prediction system utilizes multiple combinations of loss functions to train the depth prediction model. In various implementations, as the granularity of captured depth data increases, the depth prediction system is able to utilize additional loss measures. For example, in one or more implementations, for digital images from low-quality data sources, the depth prediction system enforces a small number and/or less-complex loss functions. For digital images from mid-quality data sources, the depth prediction system enforces a combination of additional and/or more-complex loss functions. Similarly, for digital images from high-quality data sources, the depth prediction system enforces a combination of additional and/or complex and precise loss functions. In various implementations, the depth prediction system also applies a different combination of loss functions on an auxiliary output path to generate a loss measure for inverse depth images generated during training.

Examples of loss functions utilized by the depth prediction system in various loss combination sets include image-level normalized regression loss, pair-wise normal loss, multi-scale gradient loss, and structured-guided ranking loss. In one or more implementations, the depth prediction system determines image-level normalized regression loss by normalizing ground truth depth images across image sets and removing outlier data before calculating a pair-wise error between predicted depth images and ground truth depth images. In some implementations, the depth prediction system determines pair-wise normal loss by comparing orthogonal angles of pairs of normals between the predicted depth images and ground truth depth images to improve the local and global geometry quality of depth images.

In various implementations, the depth prediction system utilizes a trained depth prediction model to generate depth images. For example, in one or more implementations, the depth prediction system provides a single non-stereo digital image (e.g., an image having no depth data) to the trained depth prediction model, which generates an accurate depth map (or inverse depth map) for the input image. Indeed, because the depth prediction model is robustly trained utilizing diverse ground truth depth images from mixed-data digital image sources, the depth prediction system can utilize the trained depth prediction model to generate highly-accurate depth images (e.g., depth maps) from input images.

As mentioned above, conventional systems suffer from a number of problems with regard to the accuracy and flexibility of computing device operations. To illustrate, regarding accuracy, many conventional systems produce inaccurate depth maps of images. For example, several conventional systems train on low-quality ground truth data, and as a result, are unable to create accurate and precise depth maps. Indeed, many conventional systems are inhibited, in part, by the narrow availability of high-quality ground truth depth data, which is often limited to a very specific scope or domain.

In some cases, a few conventional systems attempt to overcome the challenge of obtaining sufficient high-quality ground truth depth images by alternatively seeking to utilize relative depth annotations, such as stereo images scared from online sources. While these images span a diverse range of scenes and provide generalization for these systems, this ground truth depth data is insufficient to determine and utilize direct, accurate, or precise depth regression losses to generate accurate depth maps. Rather, this source of data yields rough and vague depth losses, which results in imprecise and blurry depth maps. Accordingly, these conventional systems are unable to recover high-quality and accurate geometric depth structure and data, such as planes and edges when creating depth maps.

As mentioned above, many conventional systems are also inflexible. As one example, several conventional systems are limited to poor training data sets. On one hand, some conventional systems rely on a diverse set of low-quality depth data, which results in imprecise and blurry depth maps. On the other hand, other conventional systems use a narrow scope of higher-quality data that is limited to generating depth maps for input images within the narrow scope of the training data. Indeed, special hardware, which is expensive and not readily available, is often required to capture precise and detailed depth data for an image, which causes many conventional systems to be limited in their capabilities.

Moreover, as another issue, ground truth depth data from different sources often have different parameters and formats. As a result, several conventional systems are unable to use ground truth depth data that is captured from different sources even if the depth data is of similar quality because the depth data is inconsistent. Accordingly, many conventional systems struggle to capture enough depth data to generate flexible and robust outputs of depth maps.

The depth prediction system can provide numerous advantages and benefits over conventional systems. As described below, in many implementations, the depth prediction system improves accuracy relative to conventional systems. To illustrate, the depth prediction system can build a robust monocular depth prediction model from mixed-data digital image sources. In many implementations, the depth prediction model generates an accurate and detailed depth map that showcases high-quality geometric features with accurate precision, such as planes and edges.

To illustrate, in various implementations, the depth prediction system trains a depth prediction model utilizing multiple data ground truth digital image sets. To increase the robustness and scope of the depth prediction model, the depth prediction system utilizes sets of ground truth digital images that vary in quality and captured depth data granularity. By utilizing multiple mixed-data digital image sources, the depth prediction system can improve the accuracy of generated depth maps while also increasing image diversity. Further, as described above, the depth prediction system can account for data sources having different parameters and formats.

In one or more implementations, to increase output accuracy, the depth prediction system utilizes a combination of different loss functions to tune and train the depth prediction model. For example, the depth prediction model enforces different types of supervisions (e.g., loss functions) on the different data sources through a multi-branch architecture of the depth prediction model. By utilizing different combinations or sets of loss functions with the different depth data granularities of the mixed-data digital image sources, the depth prediction system can generate accurate and precise loss measurements that, when used to tune the depth prediction model, result in accurate depth maps (i.e., depth images). Indeed, the depth prediction system can enforce a combination of loss functions that leverage the best available depth data of a ground truth digital image set, thereby, resulting in a very accurate prediction model.

Additionally, in various implementations, the depth prediction system utilizes loss functions fitted to particular types of ground truth depth data. As one example, the depth prediction system enforces a pair-wise normal loss on high-quality ground truth depth data and measures mismatches between planar regions and edges between a predicted depth image and a ground truth depth image. In various implementations, utilizing pair-wise normal loss improves the local and global geometry quality of the depth map (i.e., depth image) by generating a depth map that is not blurry or inaccurate. As another example, in many implementations, the depth prediction system enforces an image-level normalized regression loss function that allows for accurate loss measurements across different ground truth digital image sets.

By way of empirical evidence, researchers have found that the implementations disclosed herein provide increased accuracy over conventional systems. Indeed, Tables 2-4 below provide qualitative results of the depth prediction system outperforming conventional systems in terms of generating accurate depth maps. Further, FIGS. 7C and 8, which are described below, provide qualitative results of the depth prediction system providing more accurate depth maps than conventional systems.

As mentioned above, by enforcing different combinations of loss functions on different sets of ground truth depth images from different sources, the depth prediction system increases the accuracy of computing devices. In a similar manner, the depth prediction system also increases efficiency and performance relative to conventional systems. For example, for high-quality ground truth depth images that include depth measurement data (e.g., a three-dimension point cloud), the depth prediction system applies a pair-wise normal (PWN) loss function to efficiently measure loss based on geometric difference caused by the depth prediction model during training. In addition, the depth prediction system can apply other loss functions to this ground truth depth data to maximize the types of loss measurements that can be determined from this type of ground truth depth data. Moreover, as the granularity of depth data reduces in a ground truth digital image set, the depth prediction system can efficiently apply fewer and/or less-precise loss functions to continue to efficiently determine loss measurements based on available depth data.

Further, the depth prediction system also often improves flexibility relative to conventional systems. As mentioned above, the depth prediction system utilizes mixed-data digital image sources. Often, the mixed-data digital image sources include ground truth depth data having different depth ranges and or depth formats. To overcome these issues, in various implementations, the predicted depth system enforces an image-level normalized regression (ILNR) loss function to accurately and consistently measure losses across different ground truth digital image sets. For example, the depth prediction system utilizes image-level normalized regression to normalize ground truth depth images from different data sources to the same depth range. In some implementations, the depth prediction system also removes outlier data to further align the different data sources. In this manner, the depth prediction system can flexibly overcome the challenges presented by different data sources.

As illustrated by the foregoing discussion, the present disclosure utilizes a variety of terms to describe the features and advantages of the media segment system. To illustrate, the term "digital image" (or simply "image") refers to a digital visual representation (e.g., a digital graphics file that when rendered displays one or more objects or scenes). In various implementations, images are made up of pixels that group together to form a visual representation. In various implementations, an image editing system displays an image on a computing device, such as a client device.

In one or more implementations, a digital image includes a depth image. As used herein, the term "depth image" includes a digital image having and/or portraying depth data from a captured perspective. In various implementations, a depth image portrays objects, surfaces, edges, and/or planes in an image located at different depths. Examples of depth images include, but are not limited to, LiDAR images, three-dimensional images (real or synthetic), instance plane images, calibrated stereo images, and uncalibrated stereo images. Depth images may also include depth maps (or inverse depth maps) that indicate captured depth data for a digital image, such as the distance from a viewpoint to surfaces of objects, planes, and edges in the digital image.

The term "machine-learning model" refers to computer-implemented algorithms that model high-level abstractions in data by generating data-driven predictions or decisions from the known input data. Examples of machine-learning models include computer representations that are tunable (e.g., trained) based on inputs to approximate unknown functions. For instance, a machine-learning model includes a model that utilizes algorithms to learn from, and make predictions on, known data by analyzing the known data to learn to generate outputs that reflect patterns and attributes of the known data. For example, machine-learning models include decision tree models, random forest models, gradient boosting models, neural networks (e.g., convolutional neural networks), linear regression models, logistical regression models, or support vector machines (SVM) models.

In various implementations, the depth prediction system utilizes a machine-learning model, such as a depth prediction machine-learning model (or simply "depth prediction model") to generate predicted depth images from a digital image. In many implementations, as used herein, the term "predicted depth image" refers to a depth image generated by a depth prediction machine learning model, such as a depth map or an inverse depth map. For example, the depth prediction model generates a depth map from a first output path and an inverse depth map from an auxiliary output path (or vice versa). An inverse depth map refers to a depth map where distance values are reflected by the inverse of the depth (e.g., 1/d).

In a number of implementations, the depth prediction system utilizes supervisory learning to build, train, or create a machine-learning model, such as a depth prediction model. In various implementations, the depth prediction system utilizes a set of ground truth digital images. As used herein, the term "ground truth digital image set" refers to a collection of digital images and corresponding pairs of ground truth depth images (or simply "ground truths") that reveal captured depth data about the digital images. For example, in some implementations, a ground truth depth image refers to a depth map, inverse depth map, three-dimensional point cloud, LiDAR data, or stereo-based depth data. Indeed, a ground truth depth image may include various depth details regarding the scale and/or shift measurements of surfaces, planes, and edges in a digital image.

In various implementations, a ground truth digital image set is associated with an image source. As used herein, the term "digital image source" (or simply "source") refers to a method or approach for generating depth data in digital images and/or ground truth depth images (i.e., an image creation source). For instance, in one or more implementations, a ground truth digital image set having a given source refers to all ground truth depth images in the set having the same type and granularity of captured depth data. For example, one source represents ground truth depth images made up of calibrated stereo-based depth data while a second source represents ground truth depth images made up of depth maps and/or inverse depth maps. In some implementations, a source may also refer to an image repository that stores and provides image pairs between digital images and ground truth depth images.

As used herein, the terms "loss function" or "loss model" refer to a function that indicates error amounts. For instance, a loss function determines a measure of loss between a predicted depth image and a corresponding depth image based on one or more criteria. In various implementations, a machine-learning algorithm repetitively trains the depth prediction model to minimize overall loss. In some embodiments, the depth prediction system utilizes one or more loss functions to determine multiple measures of loss. Indeed, in one or more implementations, the depth prediction system selects a combination of loss functions that efficiently fits the granularity of depth data provided by a ground truth depth image. Examples of loss functions include image-level normalized regression loss, pair-wise normal loss, multi-scale gradient loss, structure-guided ranking loss, pixel loss, and perceptual loss.

Additional detail regarding the depth prediction system will now be provided with reference to the figures. For example, FIG. 1 illustrates a schematic diagram of a digital medium system environment 100 in which a depth prediction system 106 operates in accordance with one or more implementations. As shown in FIG. 1, the digital medium system environment 100 ("environment 100") includes a server device 102, as client device 108, and digital image sources 112 connected via a network 114. Additional detail regarding these computing devices is provided below in connection with FIG. 13. In addition, FIG. 13 also provides additional detail regarding networks, such as the illustrated network 114.

As shown, the server device 102 includes a content management system 104. The content management system 104 is able to perform a variety of functions. For example, in one or more embodiments, the content management system 104 facilitates the distribution of various digital content items across the network 114. In one or more implementations, the content management system 104 facilitates, identifies, receives, accesses, opens, loads, edits, modifies, moves, copies, shares, saves, removes, deletes, stores, downloads, transmits, and/or imports digital content. Examples of digital content include digital images, including regular images and depth images.

As illustrated, the content management system 104 includes a depth prediction system 106 (e.g., a machine-learning depth image prediction system). While shown within the content management system 104, in various implementations, the depth prediction system 106 is located apart from the content management system 104. Further, in some implementations, the depth prediction system 106 is implemented on the client device 108 or across multiple computing devices (e.g., on both the server device 102 and the client device 108).

In one or more implementations, the depth prediction system 106 trains and utilizes a depth prediction model (e.g., a depth image prediction machine-learning model) to accurately and efficiently generate depth images (e.g., depth maps) from input images lacking depth data. As further described below, in various implementations, the depth prediction system 106 utilizes mixed-data digital image sources having different depth data granularities in connection with different combinations of loss functions to train the depth prediction model.

As illustrated in FIG. 1, the environment 100 includes the digital image sources 112. In various implementations, the digital image sources 112 generate, create, receive, obtain, encode, modify, store, transmit, share, or otherwise manage ground truth digital image sets. For example, the digital image sources 112 generate ground truth depth images having depth data for corresponding digital images. In various implementations, digital image sources 112 include different sources that correspond to different granularities (i.e., level of detail) of captured depth data.

To illustrate by way of example, a first digital image source generates high-quality ground truth digital image sets having ground truth depth images specifying precise scale and shift depth metrics for digital images. Another digital image source generates mid-quality digital image sets having ground truth depth images specifying calibrated stereo-data provided by a stereo image capturing device. Still another digital image source generates low-quality ground truth digital image sets having ground truth depth images specifying uncalibrated stereo-data with unknown scale and shift depth metrics.

Additionally, the environment 100 includes the client device 108. In some implementations, the client device 108 accesses the depth prediction system 106. For instance, a client application 110 (e.g., a web browser or a mobile application) on the client device 108 provides an input image (e.g., an input image) to the depth prediction system 106. In response, the depth prediction system 106 generates and returns a depth map (or inverse depth map) to the client device 108.

In some implementations, the client application 110 represents an image editing application for editing digital images. In these implementations, the client application 110 utilizes the depth prediction system 106, or a portion thereof, to transform digital images into depth images. For example, the client application 110 downloads the depth prediction model and/or utilizes the depth prediction model on the server device 102 to generate a depth image from an input image.

Although FIG. 1 illustrates a particular number, type, and arrangement of components within the environment 100, various additional environment configurations are possible. For example, the server device 102 represents a set of connected server devices. Additionally, the server device 102 may communicate directly with the client device 108 or one or more of the digital image sources 112, bypassing the network 114, or utilizing a separate and/or an additional network. Further, in some implementations, the environment 100 includes additional components, such as additional client devices.

Figure 2:
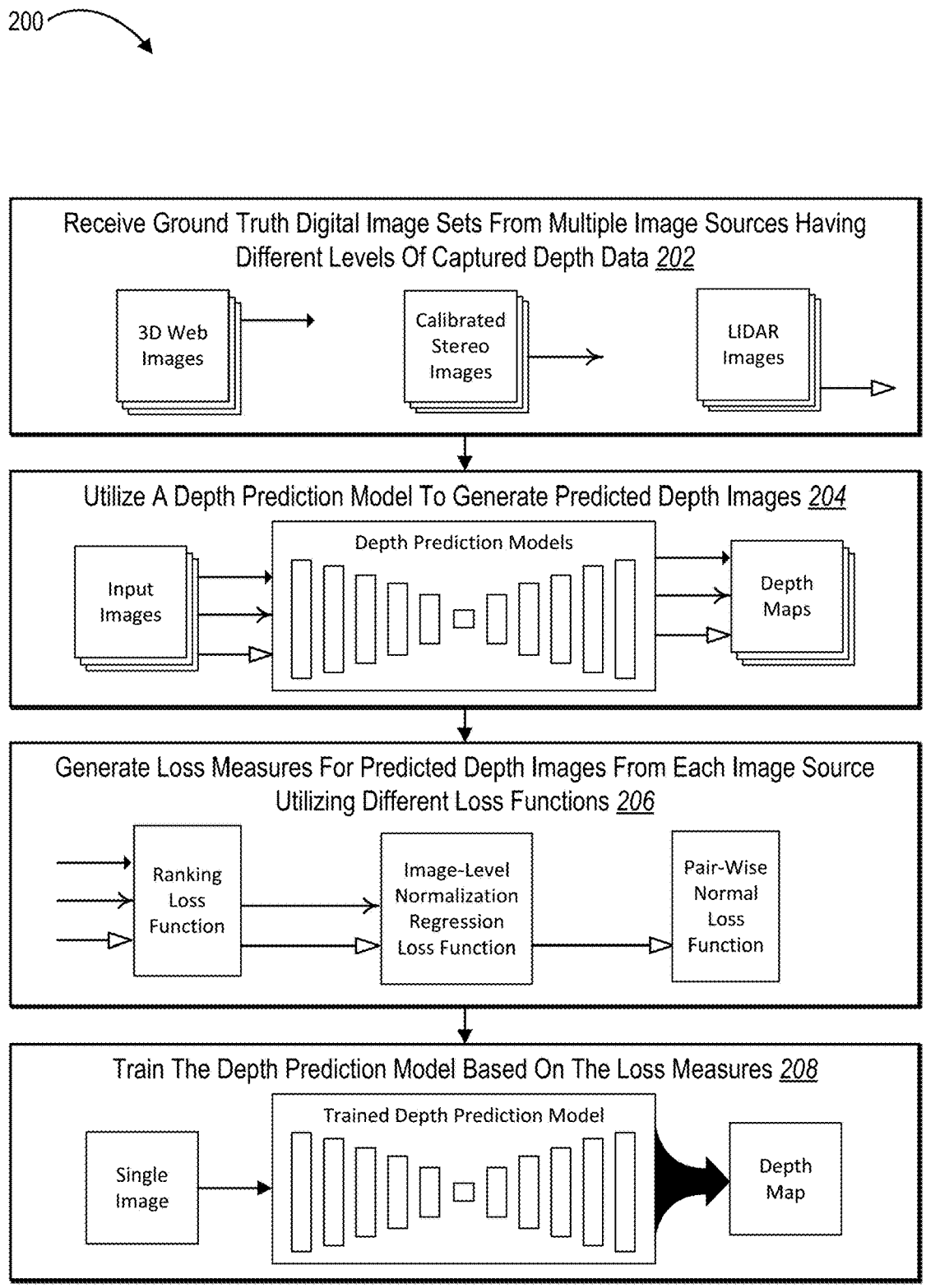
FIG. 2 illustrates an overview diagram of training a depth prediction model based on mixed-data digital image sources and multiple loss functions in accordance with one or more implementations.

As indicated above, FIG. 2 illustrates an overview diagram of training a depth prediction model based on mixed-data digital image sources and multiple loss functions in accordance with one or more implementations. In particular, FIG. 2 includes a series of acts 200 performed by the depth prediction system 106 of training a depth prediction model. For example, in various implementations, the depth prediction system 106 receives ground truth digital image sets (or simply "ground truth sets") that include a set of images along with a corresponding set of ground truth digital images (or simply "ground truths") have captured depth data of the images.

In various implementations, the depth prediction system 106 performs an act 202 of receiving ground truth sets from multiple image sources. As noted above, in one or more implementations, image sources correspond to the method or approach for generating depth data in images. In these implementations, different sources correspond to image sets that have different granularities and/or levels of captured depth data. For example, a first source of 3D web stereo images includes rough depth data such as depth disparities for corresponding images, a second source of calibrated stereo images includes a set of images captured by a specialized stereo camera with known depth parameters, and a third source of LiDAR images includes precise depth measurements with respect to scale and shift. Additional detail regarding mixed-data digital image sources is provided below with respect to FIG. 5.

As shown in FIG. 2, the depth prediction system 106 also performs an act 204 of utilizing a depth prediction model to generate predicted depth images. For instance, in various implementations, the depth prediction system 106 utilizes the depth prediction model to process images from the image sources (e.g., input images) to generate predicted depth images. In many implementations, the depth prediction system 106 generates depth maps from the input images.

In various implementations, the depth prediction system 106 inferences input images from each of the image sources. For example, as shown, the depth prediction system 106 processes input images from the first source of 3D web stereo images (i.e., the top arrow), the second source of calibrated stereo images (i.e., the middle arrow), and the third source of LiDAR images (i.e., the bottom arrow) to generate predicted depth images. Additional detail regarding the depth prediction model is provided below with respect to FIGS. 3A-3B.

As illustrated in FIG. 2, the depth prediction system 106 also performs an act 206 of generating loss measures for predicted depth images from each image source utilizing different loss functions. For instance, in various implementations, the depth prediction system 106 determines a loss or error amount between a predicted depth image and a corresponding ground truth. In one or more implementations, the depth prediction system 106 converts the ground truth to a depth map (or an inverse depth map) to match the format of the predicted depth image produced by the depth prediction model.

Additionally, the depth prediction system 106 enforces different sets of loss functions for ground truths (i.e., ground truth depth images) based on their depth data granularity. For example, in one or more implementations, to determine a loss measure between a predicted depth image and a corresponding ground truth from the first source of 3D web stereo images (i.e., the top arrow), the depth prediction system 106 utilizes a ranking loss function, as shown. Indeed, because the ground truth from the first source includes coarse, low-quality depth data, the depth prediction system 106 applies a less precise and simplified loss function.

Further, to determine a loss measure between a predicted depth image and a corresponding ground truth from the third source of LiDAR images (i.e., the bottom arrow), the depth prediction system 106 utilizes the ranking loss function, an image-level normalized regression loss function, and a pair-wise normal loss function as shown. Here, because the ground truth from the third source includes precise, high-quality depth data, the depth prediction system 106 enforces a range of loss functions, including very precise loss functions, to accurately determine a measure of loss. Additional detail regarding loss function combinations and sets is provided below with respect to FIGS. 3A-3B, 6, and 7A-7C.

As shown in FIG. 2, the depth prediction system 106 also performs an act 208 of training the depth prediction model based on the loss measures. For instance, in various implementations, the depth prediction system 106 utilizes the loss measures for each of the loss functions to tune and train the depth prediction model. Indeed, in these implementations, the depth prediction system 106 backpropagates the multiple loss measures (either separately or in aggregate) to layers of the depth prediction model until the depth prediction model converges or another condition is met.

Further, in many implementations, the depth prediction system 106 utilizes the trained depth prediction model to generate a depth map (i.e., a depth image). For example, once the depth prediction model is trained, the depth prediction system 106 can inference generated depth maps for non-stereo input images. Indeed, because the depth prediction model is robustly trained utilizing diverse sets of ground truths and loss functions, the depth prediction system 106 is able to generate highly accurate depth maps from images in the wild that lack depth data. Additional detail regarding utilizing a trained depth prediction model is provided below with respect to FIG. 4.

Figure 3A:
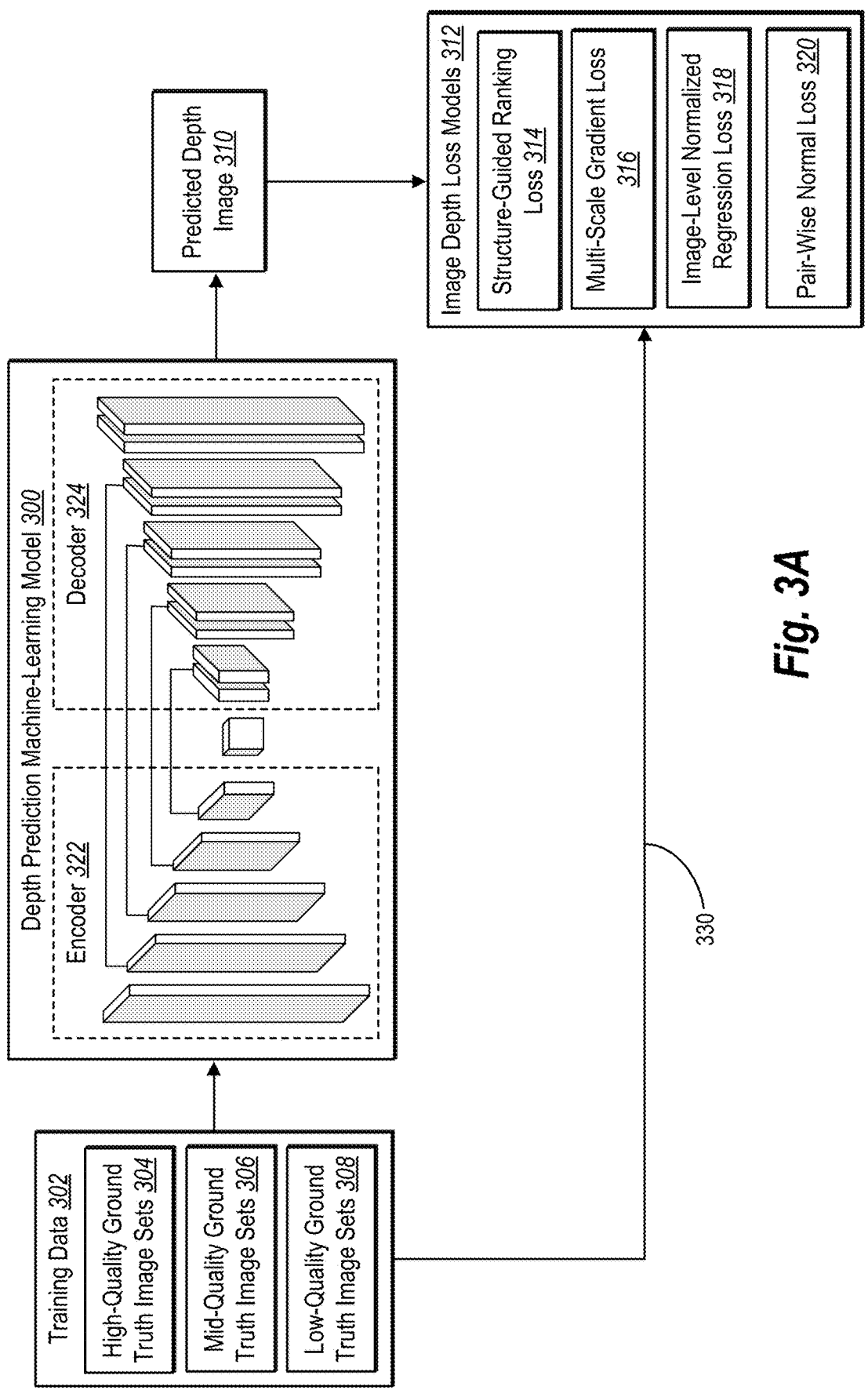
FIGS. 3A-3B illustrate block diagrams of building a depth prediction model in accordance with one or more implementations.
Figure 3B:
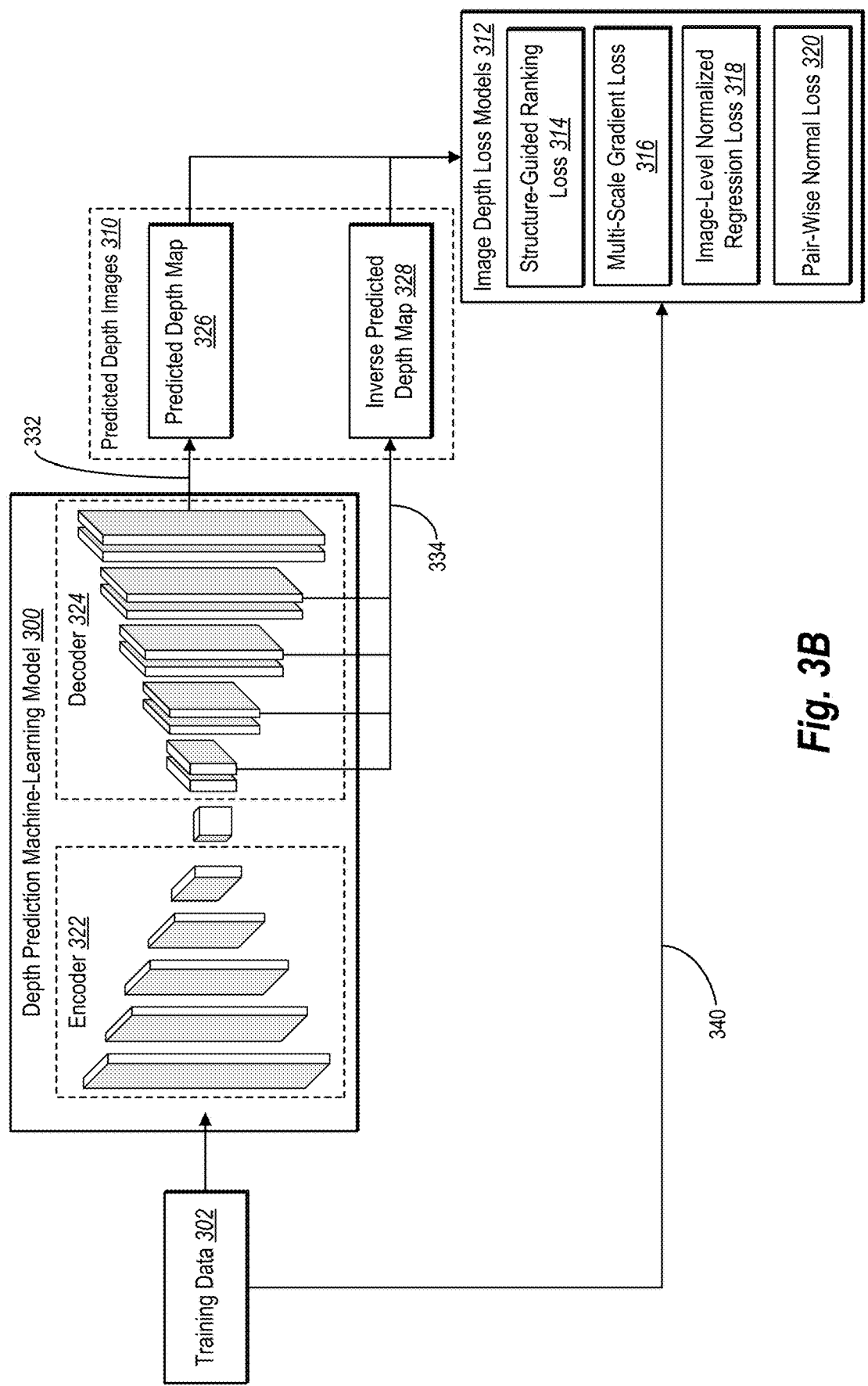

As mentioned above, FIGS. 3A-3B relate to training a depth prediction model. In particular, FIGS. 3A-3B illustrate block diagrams of building a depth prediction model in accordance with one or more implementations. In various implementations, the depth prediction model is illustrated in FIGS. 3A-3B is implemented by the depth prediction system 106 on a server device and/or a client device.

As shown, FIG. 3A includes a depth prediction machine-learning model 300 (e.g., a depth prediction neural network), training data 302, a predicted depth image 310, and an image depth loss model 312. The training data 302 includes multiple ground truth digital image sets. As mentioned above, in various implementations, each ground truth digital image set includes a set of digital images (e.g., images) and a corresponding set of ground truth depth images (e.g., ground truths). In one or more implementations, the ground truth digital image sets can correspond to different sources (i.e., image creation sources) that create ground truths having different granularities of depth data.

To illustrate, the training data 302 includes high-quality ground truth image sets 304, mid-quality ground truth image sets 306, and low-quality ground truth image sets 308. In one or more implementations, the high-quality ground truth image sets 304 include ground truths that include a fine granularity of captured depth data, such as precise scale and shift depth measurements. The mid-quality ground truth image sets 306 include an intermediary level of depth data, such as calibrated distance measurements for surfaces, edges, and planes within a corresponding image. Further, the low-quality ground truth image sets 308 includes course depth data, such as indications as to which points are closer to a viewpoint than others. Additional detail with respect to image sources is provided below with respect to FIG. 5.

As shown, FIG. 3A includes the depth prediction machine-learning model 300 (or simply the "depth prediction model 300"). In various implementations, the depth prediction model 300 is a convolutional neural network that includes several neural network layers. For example, in one or more implementations, the depth prediction model 300 includes lower neural network layers that form an encoder 322 and higher neural network layers that form a decoder 324.

In various implementations, the encoder 322 of the depth prediction model 300 encodes input images into latent object feature maps or latent object feature vectors (e.g., image depth feature vectors). For example, in one or more implementations, the encoder 322 processes each input image through various neural network layers (e.g., convolutional, ReLU, and/or pooling layers) to encode depth data from the input images into a depth feature vector (e.g., a string of number in vector space representing the encoded image data). In example implementations, the encoder 322 is based on a ResNet50, ResNeXt101, or other architectures used for feature extraction.

In some implementations, the decoder 324 decodes the depth feature vector into a predicted depth image 310. For instance, in one or more implementations, the decoder 324 is made up of fully connected layers and/or other higher neural network layers such as convolutional, transposed convolutional, attention, and/or classification layers. As shown in FIG. 3A, in various implementations, the depth prediction model 300 includes skip-connections that bridge feature vectors between earlier layers of the encoder 322 and analogous layers of the decoder 324 (i.e., shown by the four connecting lines).

During training, the depth prediction system 106 tunes weights and parameters of the depth prediction model to generate predicted depth images with improved accuracy. In various implementations, the depth prediction system 106 utilizes the image depth loss model 312 to determine one or more measures of loss (e.g., depth image losses), which are used to tune the depth prediction model. As shown, the image depth loss model 312 includes multiple loss types corresponding to different loss functions. In particular, the image depth loss model 312 includes a structure-guided ranking loss 314 (or simply "ranking loss 314"), multi-scale gradient loss 316, image-level normalized regression loss 318, and pair-wise normal loss 320.

With respect to the loss functions, in various implementations, the ranking loss 314 corresponds to a ranking loss function that determines relative depth in images. For example, in one or more implementations, a ranking loss function measures which of two points is closer to the image capturing viewpoint (e.g., camera). However, because of its simplicity, the ranking loss function is unable to determine distances or angles. Accordingly, the depth prediction system 106 may enforce the ranking loss function with almost any quality level of depth data (e.g., low-quality ground truths and above). In some implementations, the depth prediction system 106 utilizes a ranking loss function as described in Xian et al., *Structure-Guided Ranking Loss For Single Image Depth Prediction*, published on pages 611-620 of the Proceedings of IEEE Computer Society Conference on Computer Vision and Pattern Recognition, 2020 (i.e., hereinafter "SGRL"), the entirety of which is incorporated herein by reference.

The multi-scale gradient loss 316, in many implementations, corresponds to a multi-scale gradient (MSG) loss function. In one or more implementations, the multi-scale gradient loss 316 captures log-depth differences and/or depth gradients across large image distances. For example, the multi-scale gradient loss 316 makes depth maps sharper at edges and smoother at planar regions. In these implementations, a ground truth can include more than a minimum amount of depth data for the multi-scale gradient loss measurement (e.g., mid-quality ground truths and above), making the multi-scale gradient loss function more complex than the ranking loss function. For example, in various implementations, the depth prediction system 106 determines multi-scale gradient loss 316 utilizing the formulation shown in Equation 1 below.

$$\mathcal{L}_{MSG} = \frac{1}{N}\sum_{k=1}^{K}\sum_{i=1}^{N}\left|\nabla_x^k d_i - \nabla_x^k \vec{d}_i^*\right| + \left|\nabla_y^k d_i - \nabla_y^k \vec{d}_i^*\right| \quad (1)$$

In example implementations, the depth prediction system 106 determines a multi-scale gradient loss 316 as described in Li et al., *MegaDepth: Learning Single-View Depth Prediction from Internet Photos*, published on pages 2041-2050 of the Proceedings of IEEE Computer Society Conference on Computer Vision and Pattern Recognition, 2018 (hereinafter "*MegaDepth*"), the entirety of which is incorporated herein by reference.

Figure 6:
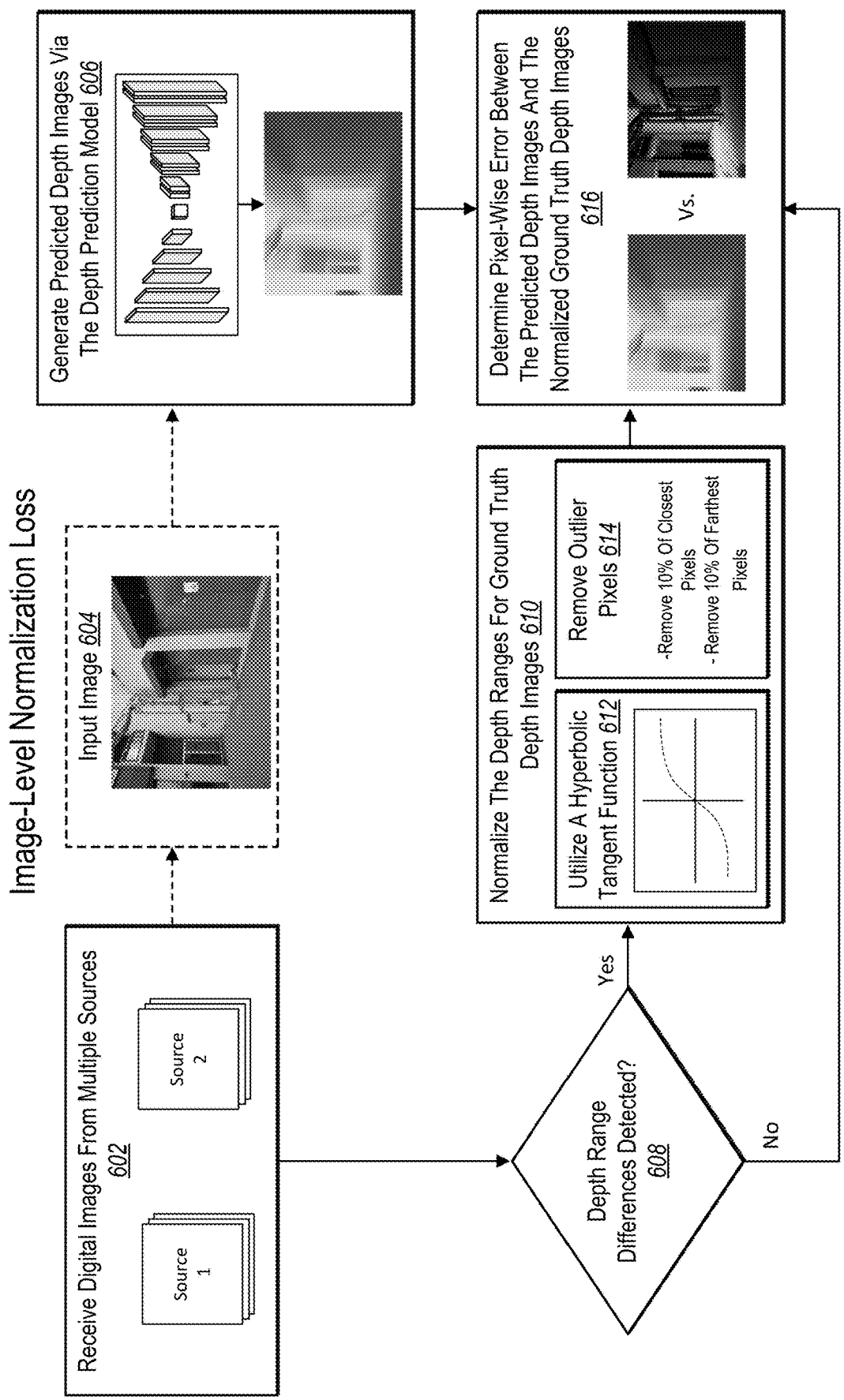
FIG. 6 illustrates a block diagram of determining image-level normalized regression loss in accordance with one or more implementations.

The image-level normalized regression loss 318, in many implementations, corresponds to an image-level normalized regression (ILNR) loss function that determines pixel-wise error and losses. For instance, in some implementations, the depth prediction system 106 enforces the image-level normalized regression loss 318 when utilizing multiple ground truth sets to train the depth prediction model 300. In one or more implementations, the depth prediction system 106 is able to accurately determine the image-level normalized regression loss 318 when a ground truth includes a higher granularity of captured depth data. FIG. 6 below provides examples and additional detail regarding image-level normalized regression loss functions.

The pair-wise normal loss 320, in various implementations, corresponds to a pair-wise normal (PWN) loss function that determines geometric losses. For example, in several implementations, the depth prediction system 106 enforces pair-wise normal loss 320 when comparing precise locations and depths of planes and edges between a predicted depth image and a corresponding ground truth. In one or more implementations, a ground truth can include a high granularity of depth data for the depth prediction system 106 (e.g., high-quality ground truths) to accurately detect pair-wise normal loss 320.

Figure 7A:
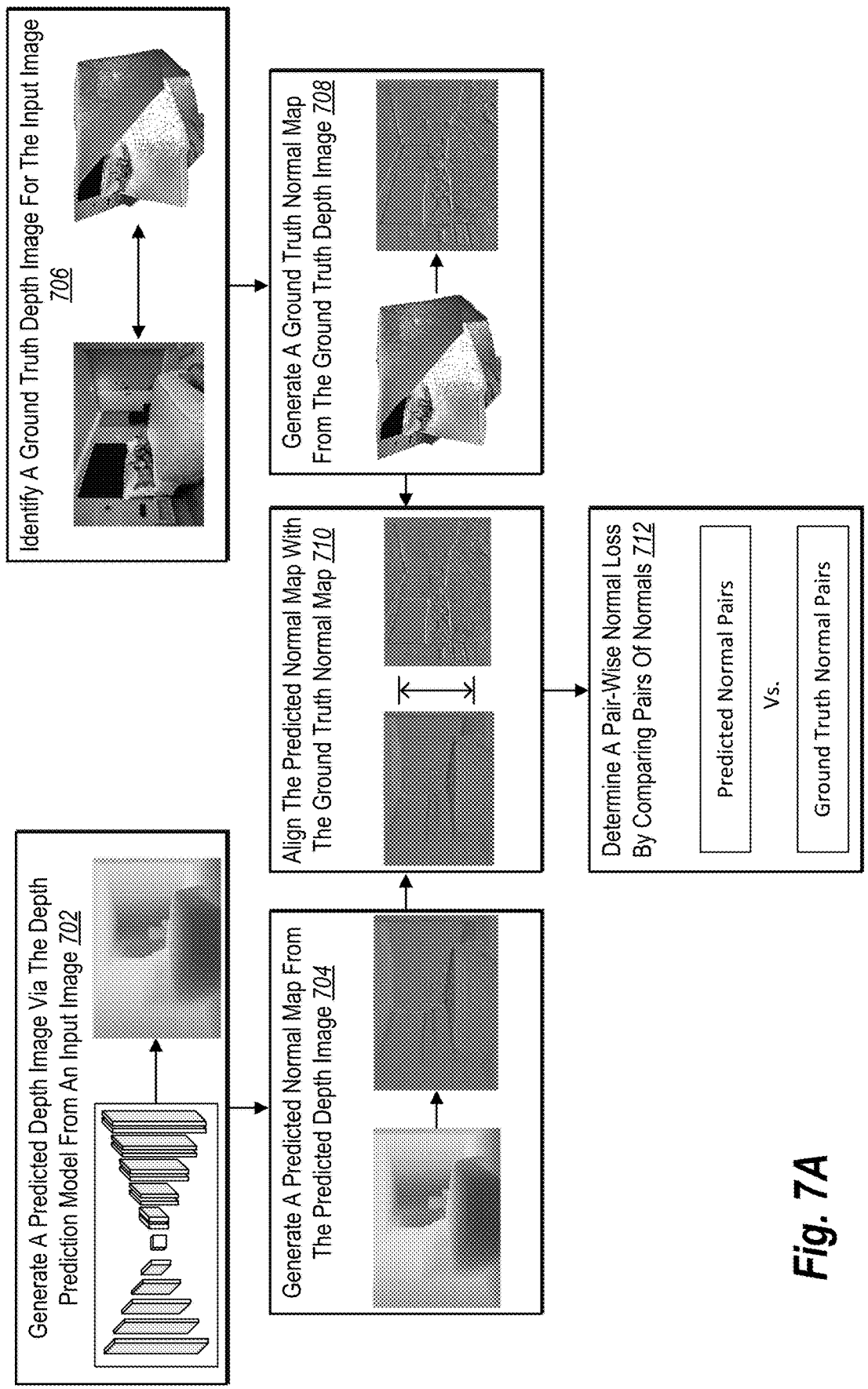
FIGS. 7A-7C illustrate block diagrams of determining pair-wise normal loss in accordance with one or more implementations.
Figure 7B:
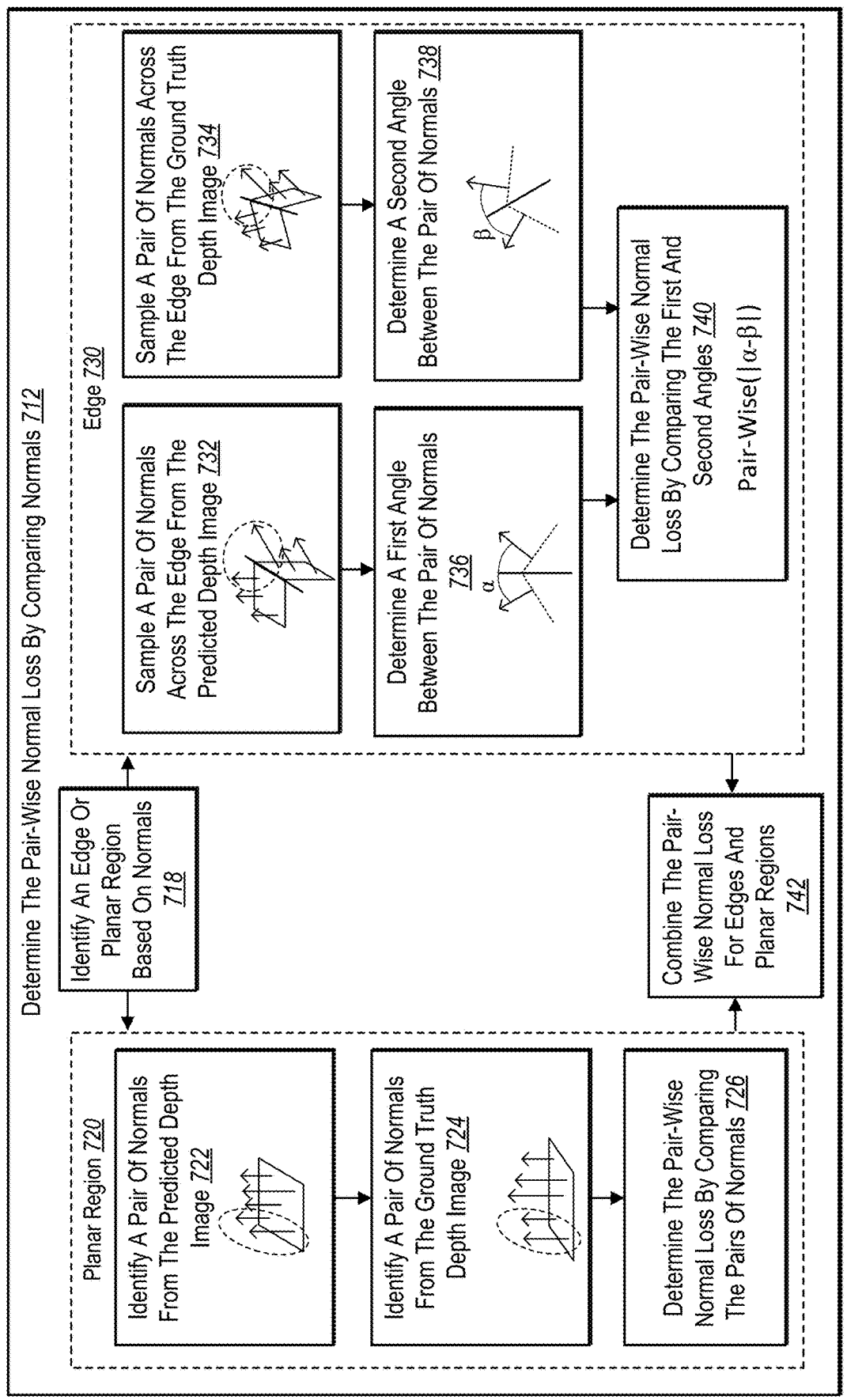
Figure 7C:
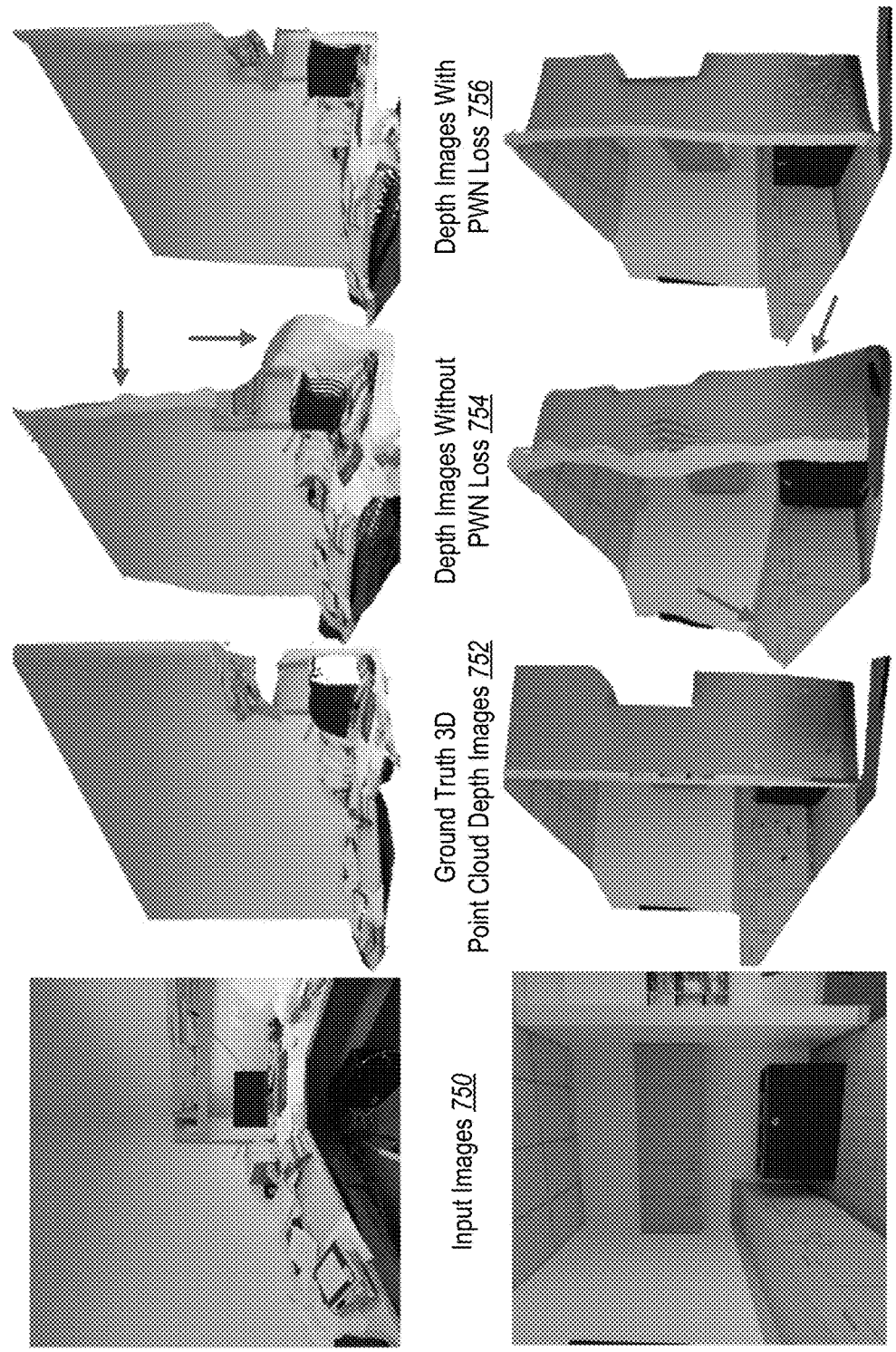

In some implementations, the depth prediction system 106 is able to accurately determine pair-wise normal loss 320 for planar regions given one level of captured depth data (e.g., mid-quality), but not for edges at this depth data level, which are less precise. However, given a higher level of captured depth data (e.g., high-quality ground truths), the depth prediction system 106 can accurately determine the pair-wise normal loss 320 for both planes and edges. FIGS. 7A-7C below provide examples and additional detail regarding pair-wise normal loss functions.

As mentioned above, in various implementations, the depth prediction system 106 enforces one or more losses during training to determine a measure of loss for a predicted depth image 310 or a batch of predicted depth images. As mentioned above, the depth prediction system 106 can utilize a set or combination of loss functions for a predicted depth image 310 or a batch of predicted depth images. In some implementations, the depth prediction system 106 determines which set of loss functions to enforce based on the source of the ground truth corresponding to a predicted depth image 310. As described above, the granularity of captured depth data in a ground truth can determine the loss functions that depth prediction system 106 utilizes to accurately measure loss during training.

To elaborate, in one or more implementations, the depth prediction system 106 provides a first input image from the low-quality ground truth image sets 308 to the depth prediction model. By processing the first image, the depth prediction model generates a first predicted depth image (e.g., a depth map), which the depth prediction system 106 provides to the image depth loss model 312. The depth prediction system 106 also provides the image depth loss model 312 with a ground truth 330 from the low-quality ground truth image sets 308 (e.g., a low-quality ground truth) corresponding to the first image. In these implementations, the depth prediction system 106 determines that while the low-quality ground truth includes disparity depth data, it lacks scale and shift depth data. Accordingly, the depth prediction system 106 utilizes a ranking loss function between the first predicted depth image and the low-quality ground truth, but not the other loss functions.

Continuing the example, the depth prediction system 106 provides a second input image from the high-quality ground truth image set 304 to the depth prediction model, which generates a second predicted depth image. Similarly, the depth prediction system 106 provides the image depth loss model 312 with a ground truth 330 from the high-quality ground truth image sets 304 (e.g., a high-quality ground truth) corresponding to the second image. In these implementations, the depth prediction system 106 determines that the high-quality ground truth includes precise details regarding the scale and shift depth data of planes and edges within the second image. Accordingly, because of the fine granularity of the high-quality ground truth, the depth prediction system 106 determines to enforce a combination of loss functions that includes the ranking loss 314, the multi-scale gradient loss 316, the image-level normalized regression loss 318, and the pair-wise normal loss 320. In alternative implementations, the depth prediction system 106 determines to enforce a combination of loss functions that include fewer or different loss functions.

In one or more implementations, the depth prediction system 106 provides the image depth loss model 312 with a ground truth 330 from the mid-quality ground truth image sets 306 (e.g., a mid-quality ground truth) to measure against a predicted depth image generated from a corresponding input image from the mid-quality ground truth image sets 306. In these implementations, the depth prediction system 106 enforces the ranking loss 314, the multi-scale gradient loss 316, and/or the image-level normalized regression loss 318 as the mid-quality ground truth provides sufficient captured depth data to accurately measure these losses.

Moreover, in some implementations, the depth prediction system 106 also determines to enforce pair-wise normal loss 320 to select portions of the predicted depth image and the mid-quality ground truth. As mentioned previously, in one or more implementations, the depth prediction system 106 enforces pair-wise normal loss 320 to planar regions (e.g., local regions where planes are detected) as the captured depth data of the mid-quality ground truth is sufficiently detailed to accurately measure these regions. However, because the recovered depth discrepancies in the captured depth data of the mid-quality ground truth are less precise for local regions where edges are detected, the depth prediction system 106 determines to not calculate the pair-wise normal loss 320. Otherwise, the noisy edges would create several artifacts and cause inaccurate loss measurements. Accordingly, in these implementations, the depth prediction system 106 determines to enforce pair-wise normal loss 320 only on planar regions when the mid-quality captured depth data is provided.

Table 1 below shows an example configuration of how the depth prediction system 106 can enforce sets of loss functions to different quality levels of ground truths. As shown, Table 1 includes the ranking loss 314, the multi-scale gradient loss 316 ("MSG Loss"), the image-level normalized regression loss 318 ("ILNR Loss"), and the pair-wise normal loss 320 ("PWN Loss"), which may be applied to edges or planes.

TABLE 1

| Ground Truth Image Set | Ranking Loss | MSG Loss | ILNR Loss | PWN Loss (Planes) | PWN Loss (Edges) |
|---|---|---|---|---|---|
| High-Quality Ground Truths | Yes | Yes | Yes | Yes | Yes |
| Mid-Quality Ground Truths | Yes | Yes | Yes | Yes | — |
| Low-Quality Ground Truths | Yes | — | — | — | — |

While Table 1 shows a particular configuration of loss function sets, other loss function sets are possible. For example, the depth prediction system 106 determines to not include the ranking loss and/or the multi-scale gradient loss 316 in a loss function set for high-quality ground truths. As another example, a loss function set could also include scale-invariant error loss, inter-plane loss, and/or co-plane loss. Moreover, in one or more implementations, the depth prediction system 106 determines to modify the weight or influence of each loss function. For example, the depth prediction system 106 reduces the influence of the multi-scale gradient loss 316 to half of the other loss functions, as shown below.

As described above, the depth prediction system 106 trains the depth prediction model 300 in a supervised manner utilizing stochastic gradient descent (SGD). For example, in various implementations, the depth prediction system 106 determines a measure of loss (e.g., depth image loss) between predicted depth images and their corresponding ground truths. As described above, depending on the ground truths, the depth prediction system 106 enforces different combinations of loss functions to efficiently and accurately determine the depth image loss.

In one or more implementations, the depth prediction system 106 determines an overall depth image loss, as shown in Equation 2 below. As described above, the depth prediction system 106 may apply a weight (e.g., $\lambda_n$) to one or more of the loss functions. For example, in some implementations, the depth prediction system 106 reduces the weight of the multi-scale gradient loss 316 relative to the other loss functions by setting the weight of the MSG loss (e.g., $\lambda_d$), to 0.5 and the weight of the other losses to 1.0.

$$\mathcal{L}_{Total} = \lambda_a \mathcal{L}_{Ranking} + \lambda_b \mathcal{L}_{PWN} + \lambda_c \mathcal{L}_{ILNR} + \lambda_d \mathcal{L}_{MSG} \quad (2)$$

Additionally, in one or more implementations, the depth prediction system 106 utilizes the depth image loss to train and optimize the neural network layers of the depth prediction model 300 via backpropagation and/or end-to-end learning. For example, the depth prediction system 106 back propagates the depth image loss to tune the neural network layers of the encoder 322 and the decoder 324. In this manner, the depth prediction system 106 can iteratively tune and train the depth prediction model 300 to learn a set of best-fit parameters that accurately generates predicted depth images.

In various implementations, the depth prediction system 106 builds or trains the depth prediction model 300 utilizing batches of training data 302. For example, in one or more implementations, the depth prediction system 106 provides a batch of input images from the training data 302 that includes an even sampling of images from the ground truth image sets. For instance, the depth prediction system 106 generates a batch that includes the same or a similar number of high-quality images, mid-quality images, and low-quality images. In these implementations, the depth prediction system 106 can process the batch of input images together, enforce the different corresponding sets of loss functions, and backpropagate the combined loss measurements from each of the loss functions. In alternative implementations, the depth prediction system 106 generates a training batch of input images that includes more images from one ground truth image set than another (e.g., two high-quality images for each mid-quality and low-quality image).

In one or more implementations, the depth prediction system 106 aggregates the loss measures for all loss functions enforced for a batch of input images before backpropagating the loss (e.g., one back propagation per training batch). In some implementations, the depth prediction system 106 aggerates the loss measures utilized for a predicted depth image and ground truth set, which may include a single loss measure or multiple loss measures, before backpropagating the loss (e.g., one back propagation per input image). In some implementations, the depth prediction system 106 propagates the loss measures as each loss function is individually enforced (e.g., one back propagation per input image per loss function).

As shown in FIG. 3A, the depth prediction model 300 generates a predicted depth image 310. In some implementations, the predicted depth image 310 is a depth map. In alternative implementations, the predicted depth image 310 is an inverse depth map. In one or more implementations, the depth prediction model 300 includes multiple output paths. To illustrate, FIG. 3B shows a version of the depth prediction model 300 having a multi-branch architecture that utilizes multiple output paths to generate both a predicted depth map and an inverse predicted depth map during training.

In particular, as shown in FIG. 3B, the decoder 324 in the depth prediction model 300 includes multiple output channels or paths. For example, the decoder 324 includes a first output path 332 that generates a predicted depth map 326 and a second output path 334 that generates an inverse predicted depth map 328. In various implementations, the second output path 334 serves as a lightweight auxiliary path that outputs an inverse predicted depth map 328. In various implementations, the first output path 332 is symmetrical with the second output path 334.

As shown, the depth prediction system 106 generates the inverse predicted depth map 328 by accessing and concatenating the preliminary output from the neural network layers of the decoder 324. By utilizing layers of the depth prediction model to create the inverse predicted depth map 328 inside of a depth space, the depth prediction system 106 generates an accurate and useable inverse predicted depth map. To illustrate, generating an inverse depth map is more sophisticated than merely inverting the colors of a depth map, especially when scale and/or shift depth data is unknown. For example, a depth map includes disparity values that indicate how far away a point is from a camera or viewpoint, where points located farther away have larger values (called inverse disparity). Additionally, depth maps often include a number of zero values. However, these zero values do not properly invert (e.g., points having an unknown shift cannot simply have their depths "flipped"). Accordingly, to accurately generate an inverse depth map, the depth prediction system 106 accesses different layers of the decoder 324, which make up the second output path 334, to generate the inverse predicted depth map 328 inside of multi-dimensional depth space.

In one or more implementations, the depth prediction system 106 extracts preliminary predictions from earlier, shallower neural network layers of the decoder 324 to ensure that low-quality ground truths can be used to generate accurate and reasonable representations of inverse predicted depth maps, as described below. In some implementations, these shallower neural network layers of the decoder 324 include downscaled depth features that better align with less detailed depth data. Further, in various implementations, the depth prediction system 106 also utilizes the embedded information from the decoder 324 to generate the inverse predicted depth map 328.

As shown in FIG. 3B, the depth prediction system 106 provides the inverse predicted depth map 328 to the image depth loss models 312. In various implementations, the depth prediction system 106 enforces a combination of loss functions on the inverse predicted depth map 328. To illustrate, in one or more implementations, the depth prediction system 106 utilizes a combination of the ranking loss 314 and the image-level normalized regression loss 318 on the inverse predicted depth map 328 to determine a loss measure (e.g., an inverse depth image loss). For instance, the depth prediction system 106 provides a ground truth inverse depth map 340 from the training data 302 to the image depth loss models 312. The depth prediction system 106 next compares the inverse predicted depth map 328 and the ground truth inverse depth map 340 to determine the ranking loss 314 and/or the image-level normalized regression loss 318. The depth prediction system 106 may apply other combinations of loss functions in other implementations.

In various implementations, the depth prediction system 106 back propagates the inverse depth image loss to the depth prediction model 300 for training. In one or more implementations, the depth prediction system 106 provides the inverse depth image loss to layers associated with the second output path 334. In these implementations, the depth prediction system 106 locally tunes these layers to generate more accurate and precise inverse predicted depth maps.

In one or more implementations, the first output path 332 and the second output path share various neural network layers in the decoder 324. In these implementations, by tuning and regularizing the local layers corresponding to the generation of inverse predicted depth maps, the depth prediction system 106 also improves the layers corresponding to the generation of predicted depth maps. Indeed, tuning these shared layers results in improvements to both output paths. In various implementations, the depth prediction system 106 back propagates the inverse depth image loss to additional layers of the depth prediction model 300 during training.

While FIG. 3B shows the first output path 332 generating a predicted depth map 326 and the second output path 334 generating an inverse predicted depth map 328, in some implementations, the depth prediction system 106 trains the depth prediction model 300 to generate an inverse predicted depth map via the first output path 332. In one or more implementations, the depth prediction system 106 also trains the depth prediction model 300 to generate a predicted depth map via the second output path 334 (e.g., via an auxiliary output path).

Figure 4:
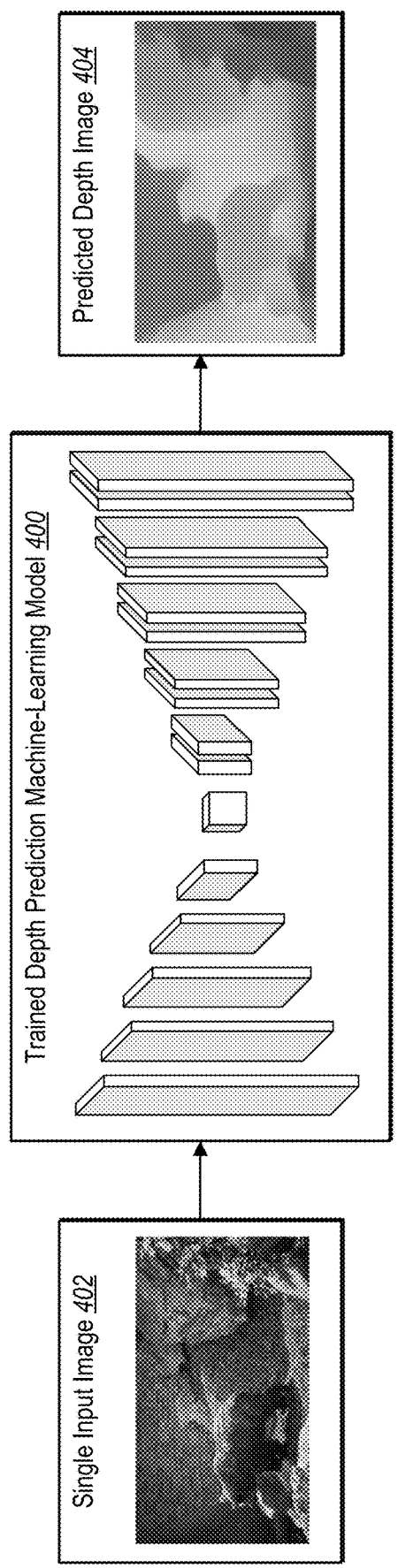
FIG. 4 illustrates a block diagram of utilizing a trained depth prediction model in accordance with one or more implementations.

Once trained, in various implementations, the depth prediction system 106 utilizes the depth prediction model to generate depth images. To illustrate, FIG. 4 shows a block diagram of utilizing a trained depth prediction model in accordance with one or more implementations. As shown, FIG. 4 includes a trained depth prediction machine-learning model 400, a single input image 402, and a predicted depth image 404.

In various implementations, the single input image 402 represents a two-dimensional digital image, such as a non-stereo, flat, or another digital image that lacks depth data. In many instances, the single input image 402 is an image from the wild, meaning a real-world image captured by a client device or found online. In alternative implementations, the single input image 402 represents a synthetic digital image lacking depth data.

In some implementations, a client device provides the single input image 402 (e.g., a query digital image) to the trained depth prediction machine-learning model 400. As shown, the depth prediction system 106 utilizes the trained depth prediction machine-learning model 400 to generate the predicted depth image 404 from the single input image. In one or more implementations, the depth prediction system 106 generates a depth map reconstructed from the single input image 402.

In some implementations, the depth prediction system 106 generates an inverse depth map, which may be used in modifying the lens blur of an image or in another application. In various implementations, the trained depth prediction machine-learning model 400 includes both output paths described above. In these implementations, the depth prediction system 106 generates both a depth map and an inverse depth map.

Figure 5:
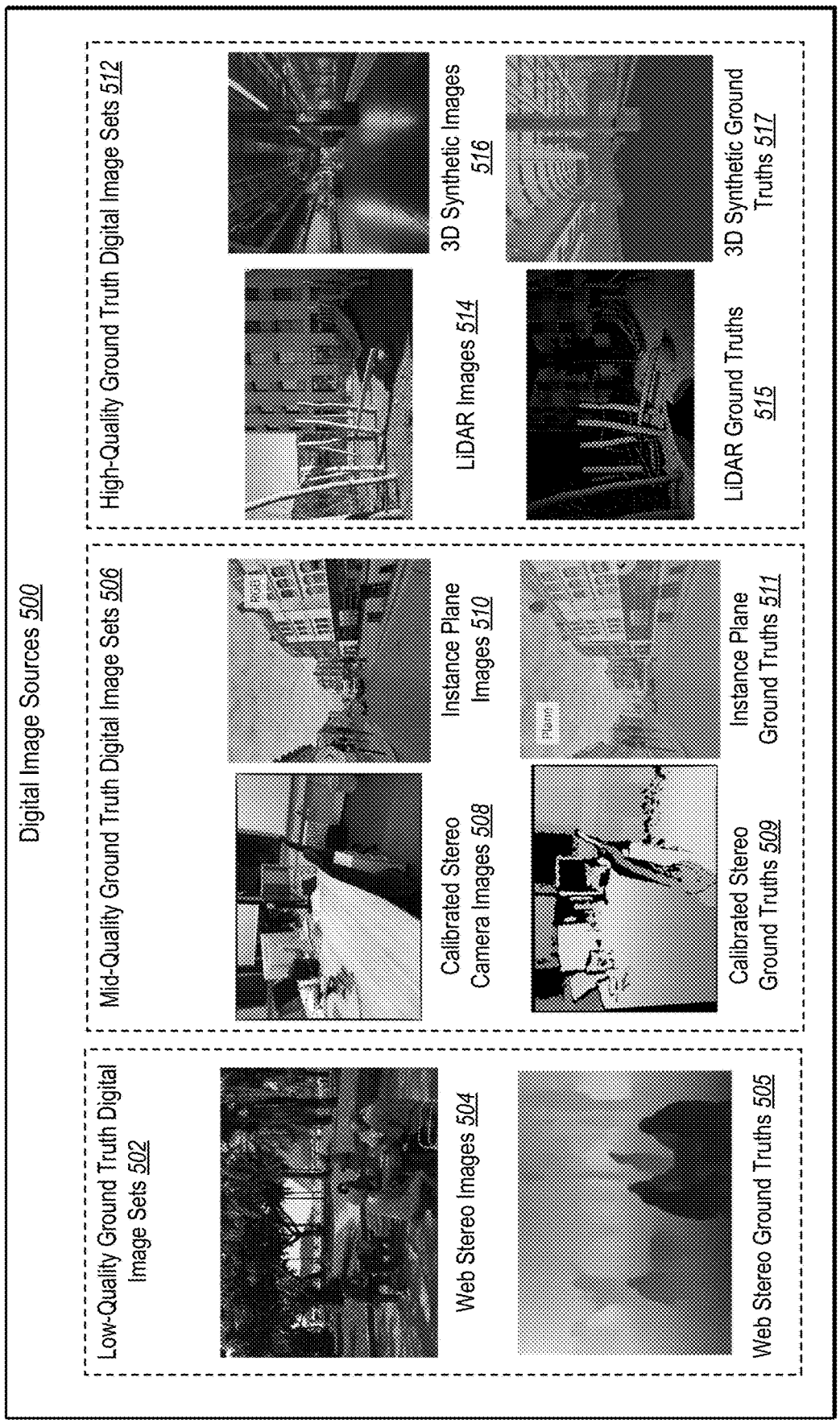
FIG. 5 illustrates a block diagram of mixed-data digital image sources in accordance with one or more implementations.

As mentioned above, FIG. 5 provides additional detail regarding mixed-data digital image sources. To illustrate, FIG. 5 shows a block diagram of mixed-data digital image sources in accordance with one or more implementations. As shown, FIG. 5 includes digital image sources 500 that include low-quality ground truth digital image sets 502, mid-quality ground truth digital image sets 506, and high-quality ground truth digital image sets 512. In various implementations, the digital image sources 500 include additional or fewer ground truth digital image sets.

In various implementations, a digital image source corresponds to the method or approach utilized to create or generate a ground truth digital image set. As described above, some creation sources will generate ground truth digital image sets that include minor amounts of depth data (e.g., the low-quality ground truth digital image sets 502) and other creation sources will generate ground truth digital image sets that include highly detailed amounts of depth data (e.g., the high-quality ground truth digital image sets 512).

As shown, each of the ground truth digital image sets includes a digital image and a corresponding ground truth depth image. In some implementations, a ground truth digital image set includes multiple ground truth depth images for a corresponding digital image. For example, for one or more images, the ground truth digital image set includes a depth map, an inverse depth map, a 3-D point cloud, and/or other depth images indicating depth disparity.

In implementations where the ground truth depth image is not a depth map (or an inverse depth map), the depth prediction system 106 may convert the ground truth depth image into a depth map. As described above, the depth prediction model outputs a predicted depth image, often in the form of a depth map. Accordingly, to determine a measure of loss by comparing the ground truth depth image to the predicted depth image, the depth prediction system 106 may first convert the ground truth depth image into a depth map (or an inverse depth map). In some implementations, the depth prediction system 106 may convert the ground truth depth image into another format, such as a normal mapping, as described below.

As illustrated, the low-quality ground truth digital image sets 502 include web stereo images 504 and web stereo ground truths 505. In various implementations, the web stereo ground truths 505 are course depth maps (or coarse inverse depth maps) generate from a pair of stereo images of an object or scene. In many implementations, the web stereo ground truths 505 do not specify scale and shift depth data but rather indicates the depth of objects in an image relative to each other (e.g., Object A is closer than Object B). Additionally, while the set of web stereo images lack detailed depth data, in various implementations, these images include a diverse scope of scenes that help the depth prediction system 106 train a balanced depth prediction model.

As shown, the mid-quality ground truth digital image sets 506 include two example ground truth sets. First, the mid-quality ground truth digital image sets 506 include calibrated stereo camera images 508 and corresponding calibrated stereo ground truths 509. In a number of implementations, the calibrated stereo ground truths 509 include depth data provided by a camera having multiple lenses and/or sensors, which are used to capture the corresponding calibrated stereo camera images 508. In this manner, because the calibrated stereo camera images 508 are coupled with camera metrics and parameters (e.g., a known distance between the lenses or sensors), the calibrated stereo ground truths 509 can indicate more precise depth data.

In addition, the mid-quality ground truth digital image sets 506 include instance plane images 510 and instance plane ground truths 511. In various implementations, the instance plane ground truths 511 include strong-geometric depth data with respect to planar regions in an image while having weaker depth data with respect to non-planar edges. Accordingly, in various implementations, the depth prediction system 106 can utilize this image set in connection with a particular combination of loss functions that determines loss measures for planar regions when omitting loss measures for edges.

As shown, the high-quality ground truth digital image sets 512 also include two example ground truth sets. For example, a first set includes LiDAR images 514 and LiDAR ground truths 515. Images captured with LiDAR, utilizes lasers (i.e., light) to measure distances of objects, include highly-detailed depth data. For example, many LiDAR ground truths 515 include precise distance measurements of objects captured in an image. Indeed, many LiDAR ground truths 515 include accurate depth data with respect to edges and planes in images. In some implementations, the LiDAR ground truths 515 is in the format of a 3D point cloud.

Moreover, the high-quality ground truth digital image sets 512 also include a second set having 3D synthetic images 516 and 3D synthetic ground truths 517. In many instances, utilizing synthetic data causes models to learn false image properties, attributes, and characteristics. However, in the implementations described herein, the depth prediction system 106 is training the depth prediction model to accurately reconstruct depth data for an image without regard to the appearance or realness of the image. Accordingly, because each object measurement in the 3D synthetic images 516 is precisely known at the time of creation, the depth prediction system 106 can flexibly utilize the highly-detailed depth data within the 3D synthetic ground truths 517 to train the depth prediction model to generate accurate edges and planes predicted depth images. As a result, the depth prediction system 106 can greatly increase the amount of high-quality training data as well as measure more precise amounts of loss utilizing the high-quality ground truths, as described above.

As shown, the digital image sources 500 include ground truth digital image sets of images. In one or more implementations, the digital image sources 500 include video. For example, a ground truth digital image set includes a video along with a corresponding ground truth video having depth data for each frame.

As mentioned above, in various implementations, the depth prediction system 106 creates training batches for the ground truth digital image sets. In a number of implementations, the depth prediction system 106 randomly samples an even number of images (and corresponding ground truths) for each quality level. In some implementations, the depth prediction system 106 favors a particular quality level. For example, the depth prediction system 106 includes additional images from the high-quality ground truth digital image sets 512 (e.g., sampling images from both the LiDAR ground truth image set and the 3D synthetic ground truth image set). In one or more implementations, the depth prediction system 106 does not evenly sample across the digital image sources 500 when generating a training batch (e.g., a batch matches the size distribution of the digital image sources 500).

Turning now to FIGS. 6 and 7A-7C, additional detail is provided regarding image-level normalized regression loss functions and pair-wise normal loss functions. For instance, FIG. 6 illustrates a block diagram of utilizing image-level normalized regression loss functions in accordance with one or more implementations. In particular, FIG. 6 includes a series of acts that the depth prediction system 106 performs to determine the image-level normalized regression loss between a predicted depth image and a corresponding ground truth. As described above, in many implementations, the depth prediction system 106 utilizes image-level normalized regression loss with digital images and ground truths from digital image sources having a medium-to-high granularity of depth data (e.g., calibrated stereo camera images, LiDAR images, 3D synthetic images).

As shown, FIG. 6 includes the depth prediction system 106 performing an act 602 of receiving digital images from multiple sources. For example, as described above, the depth prediction system 106 receives ground truth digital image sets from a variety of digital image sources that provide different granularities of depth data. In one or more implementations, the multiple sources provide the same or similar level of depth data, but utilize different depth ranges or have other non-matching depth parameters.

In various implementations, each digital image source provides ground truth digital image sets that include digital images and corresponding ground truth depth images, as described above. For example, the depth prediction system 106 provides a digital image (i.e., the input image 604) to the depth prediction model during training for the depth prediction model to process the digital image into a predicted depth image (e.g., a depth map). Additionally, the depth prediction system 106 provides a corresponding ground truth to an image depth loss model, as described above.

As shown in FIG. 6, the depth prediction system 106 performs an act 606 of generating a predicted depth image via the depth prediction model. For example, the depth prediction system 106 processes input images from each source to reconstruct predicted depth maps (or inverse depth maps), as explained earlier. As shown in connection with the act 606, the depth prediction model generates a depth map from the input image 604.

As described above, in various implementations, the multiple sources can have different depth ranges. Accordingly, as shown in FIG. 6, the depth prediction system 106 performs an act 608 of determining whether depth range differences exist. In some implementations, the depth prediction system 106 compares depth ranges with a single source. For example, outdoor images can have large to infinite depths while close-up images have very small depth ranges. In one or more implementations, the depth prediction system 106 compares depth ranges between the multiple sources. For instance, the depth prediction system 106 compares source information and/or the ground truths themselves for each source to determine whether the ground truths are measured utilizing the same depth ranges or different depth ranges.

In implementations where depth range differences are determined, the depth prediction system 106 performs an act 610 of normalizing the depth ranges for the ground truth depth images. When the depth ranges vary drastically, training the depth prediction model becomes more difficult and less accurate because the ground truths having different sources and depth ranges will result in inconsistent measures of loss. Thus, by normalizing the ground truths, the depth prediction system 106 can leverage different sources during training, as well as improve consistency within the same source, to improve training accuracy. Accordingly, the depth prediction system 106 utilizes image-level normalized regression loss to transform ground truths (e.g., ground truth depth maps) to a similar numerical range based on the individual statistics of each ground truth.

In various implementations, the act 610 includes a normalization approach that reduces the effect of outliners and long-tail residuals. As shown, the act 610 includes two sub-acts. First, the act 610 includes a sub-act 612 of the depth prediction system 106 utilizing a hyperbolic tangent function. For example, in various implementations, the depth prediction system 106 transforms the ground truth by performing a hyperbolic tangent (i.e., tanh) on the inverse disparity or depth values of the ground truth. In various implementations, the sub-act 612 transforms the ground truth into a common depth space (e.g., hyperbolic tangent space).

In one or more implementations, transforming the ground truths yields a small number of extreme values in the depth map (i.e., depth image). These outliers can disrupt the normalization of a set of ground truths. Accordingly, to treat these outliers, the depth prediction system 106 performs a sub-act 614 of removing the outlier pixels. In some implementations, the depth prediction system 106 removes a percentage (e.g., 5%, 10%, 20%) of the closest and/or farthest pixels in a transformed depth map.

To illustrate, in various implementations, the depth prediction system 106 trims the outlier pixels based on variance and mean values of the transformed ground truth (i.e., the individual statistics of the ground truth). For example, in one or more implementations, the depth prediction system 106 utilizes a trimmed Z-score based on the mean and standard deviation of the transformed depth map to remove the outlier pixels. By removing the outlier pixels, the depth prediction system 106 can ascertain and implement an accurate depth range to utilize across the multiple sources as well as standardize depth data from the same source.

In alternative implementations, when performing the act 610, the depth prediction system 106 utilizes another, normalization approach, such as Min-Max normalization, Z-score normalization, or median absolute deviation (MAD) normalization. However, because these approaches are not very sensitive to outliers, they often provide little robustness to the depth prediction model and result in poorer performance than the normalization approach described with respect to the act 610.

As shown, FIG. 6 includes the depth prediction system 106 performing an act 616 of determining a pixel-wise error between the predicted depth images and normalized ground truth depth images. For example, in one or more implementations, the depth prediction system 106 determines a pixel-wise mean average error (MAE) between the predicted depth maps and the normalized ground truth depth maps.

In various implementations, the depth prediction system 106 follows the formulation shown in Equation 3 below for determining image-level normalized regression loss. As shown in Equation 3, $\mu_{trim}$ may represent the mean of a trimmed depth map and $\sigma_{trim}$ may represent the standard deviation of the trimmed depth map, as a depth map that has removed the nearest and farthest 10% of pixels. In addition, d may represent the predicted depth image while d* represents the ground truth digital image.

$$\mathcal{L}_{ILNR} = \frac{1}{N}\sum_{i}^{N} |d_i - \vec{d}_i^*| + |\tanh(d_i/100) - \tanh(\vec{d}_i^*/100)| \quad (3)$$

where $d_i = (\vec{d}_i^* - \mu_{trim})/\sigma_{trim}$

As mentioned above, by applying image-level normalized regression loss when training the depth prediction model, the depth prediction system 106 can generate improved depth images. As evidenced by empirical data, Table 2 below shows the effectiveness of one example embodiment of the depth prediction system 106 implementing image-level normalized regression ("ILNR") loss.

TABLE 2

| Method | RedWeb WHDR↓ | NYU | KITTI AbsRel↓ | ScanNet | DIODE |
|---|---|---|---|---|---|
| SMSG | 19.1 | 15.6 | 16.3 | 13.7 | 36.5 |
| SSMAE | 19.2 | 14.4 | 18.2 | 13.3 | 34.4 |
| ILNR-MinMax | 19.1 | 15.0 | 17.1 | 13.3 | 46.1 |
| ILNR-MAD | 18.8 | 14.8 | 17.4 | 12.5 | 34.6 |
| Depth Prediction Model with ILNR | 18.7 | 13.9 | 16.1 | 12.3 | 34.2 |

As shown in Table 2, the depth prediction model trained with the image-level normalized regression loss is compared with scale-invariant multi-scale gradient loss ("SMSG") and scale-shift invariant loss ("SSMAE") on zero-shot generalization to five datasets unseen during training. As shown, the depth prediction model outperforms these other losses with respect to scale and shift-invariant losses.

For context, SMSG is described in Wang et al., Web Stereo Video Supervision For Depth Prediction From Dynamic Scenes, published on pages 348-357 of IEEE International Conference of 3D Vision, 2019. SSMAE is described in Ranftl et al., *Towards Robust Monocular Depth Estimation: Mixing Datasets For Zero-Shot Cross-Dataset Transfer*, published in IEEE Transactions of Pattern Analysis and Machine Intelligence, 2020 (hereafter "MiDaS").

In addition, Table 2 includes data for the depth prediction model being trained under different normalization options, including image-level Min-Max (ILNR-MinMax) normalization and image-level median absolute deviation (ILNR-MAD) normalization. As shown in Table 2, the depth prediction model trained with image-level normalized regression results in improved performance over normalization ILNR-MinMax and ILNR-MAD normalization.

As mentioned above, FIGS. 7A-7C provide additional detail regarding the pair-wise normal loss function. In particular, FIGS. 7A-7C illustrate determining the pair-wise normal loss in accordance with one or more implementations. As shown, FIG. 7A includes a series of acts that the depth prediction system 106 performs to determine the pair-wise normal loss between a predicted depth image and a corresponding ground truth. As described above, in many implementations, the depth prediction system 106 utilizes pair-wise normal loss with digital images and ground truths from digital image sources having a high granularity of depth data (e.g., LiDAR images and 3D synthetic images) and, in some instances, as described below, portions of sources having medium granularity of depth data (e.g., calibrated stereo images).

In one or more implementations, the depth prediction system 106 utilizes normals (i.e., surface normals) to determine loss measurements. In many implementations, the depth prediction system 106 utilize normals to improve edge sharpness when generating predicted depth image (e.g., by enforcing supervision in surface normal space when sampling normal pairs). Further, by combining edge and plane normal samples, the depth prediction system 106 efficiently and accurately constrain both global and local geometric relations.

As shown, FIG. 7A includes the depth prediction system 106 performing an act 702 of generating a predicted depth image via the depth prediction model for an input image. For instance, as described above, the depth prediction system 106 generates a predicted depth map (or inverse predicted depth map) from an input image received from a digital image source as part of a ground truth digital image set. As shown in connection with the act 702, the depth prediction system 106 generates a predicted depth map via the depth prediction model. In some implementations, the act 702 includes the depth prediction model generating a predicted normal map.

FIG. 7A also includes the depth prediction system 106 performing an act 704 of generating a predicted normal map from the predicted depth image. For example, in one or more implementations, the depth prediction system 106 generates a predicted normal map from a predicted depth map (i.e., predicted depth image) where the predicted depth map shows surface normals.

As shown, the depth prediction system 106 performs an act 706 of identifying a ground truth depth image for the input image. For example, the depth prediction system 106 obtains a ground truth three-dimensional point cloud that serves as the ground truth depth image for the input image provided to the depth prediction model in the act 702. In some implementations, the depth prediction system 106 identifies a ground truth depth image from a digital image source of instance plane ground truths.

In addition, the depth prediction system 106 performs an act 708 of generating a ground truth normal map from the ground truth depth image. For example, in various implementations, the depth prediction system 106 converts a ground truth three-dimensional point cloud into a ground truth normal map. In one or more implementations, the depth prediction system 106 utilizes a fitting method (e.g., least-square fitting) to generate the ground truth normal map from the ground truth three-dimensional point cloud.

In some implementations, the depth prediction system 106 generates a ground truth normal map from another type of ground truth depth image, such as from a ground truth depth map. Still, in one or more implementations, the ground truth digital image is stored as a ground truth normal map, and/or the ground truth digital image set for the digital image includes a ground truth normal map of the digital image. In these implementations, the depth prediction system 106 may omit or skip the act 708.

As shown, FIG. 7A includes an act 710 of the depth prediction system 106 aligning the predicted normal map with the ground truth normal map. In various implementations, the depth prediction system 106 determines a scale and shift factor. In many implementations, the depth prediction system 106 incorporates the scale and shift factor from the ground truth normal map to the predicted depth map. In alternative implementations, the depth prediction system 106 incorporates the scale and shift factor from the predicted depth map to the ground truth normal map. In either case, the depth prediction system 106 applies the same scale and shift factor to both normal maps such that the surface normals are more closely aligned. In some implementations, aligning the normal maps corrects unknown shifts in the depth scale that occur when creating the predicted normal maps. Indeed, the act 710 ensures that the predicted normal map and the ground truth normal map share the same scale and shift.

Once the surface normals are aligned, the depth prediction system 106 can compare the predicted depth map with the ground truth normal map to determine a loss measure. To illustrate, the depth prediction system 106 performs an act 712 of determining a pair-wise normal loss by comparing pairs of normals. For example, in one or more implementations, the depth prediction system 106 identifies surface normal samples from the predicted depth map corresponding surface normal samples from the ground truth normal map. Further, the depth prediction system 106 utilizes normal regression to determine a loss measure between the two mappings of normals.

In various implementations, the depth prediction system 106 compares pairs of normals between the predicted normal map and the ground truth normal map. For example, the depth prediction system 106 determines one or more normal pairs from the predicted normal map and one or more corresponding normal pairs from the ground truth normal map. From these corresponding sets of normal pairs, the depth prediction system 106 utilizes the pair-wise normal loss function to determine the pair-wise normal measure of loss.

In various implementations, the depth prediction system 106 applies different sampling approaches for planes and edges within a normal map. To illustrate, FIG. 7B shows an expansion of the act 712, where the depth prediction system 106 determines the pair-wise normal loss based on surface normal pairs samples from both planar regions and edges. In this manner, the depth prediction system 106 better constrains both global and local geometric relations when determining pair-wise normal loss, which greatly increases the accuracy of the depth prediction model during training.

To illustrate, FIG. 7B shows the depth prediction system 106 performing a number of sub-acts of the act 712. For instance, FIG. 7B includes a sub-act 718 of the depth prediction system 106 identifying an edge or a planar region based on normals. In one or more implementations, the depth prediction system 106 analyzes either the predicted normal map or the ground truth normal map to determine if surface normals in an area or region share a similar direction or abruptly change direction. For example, the depth prediction system 106 identifies a group of surface normals in a region of the ground truth normal map. For the group, the depth prediction system 106 compares the orthogonal direction of each normal. If the direction of the normals are within a similarity threshold, the depth prediction system 106 determines that the region is planar. Otherwise, if the directions of the normal exceed the similarity threshold, the depth prediction system 106 determines that the area includes an edge.

As shown, for a planar region 720, the depth prediction system 106 performs the sub-acts 722-726. To illustrate, when a planar region 720 is detected, the depth prediction system 106 performs a sub-act 722 of identifying a pair of normals from the predicted depth image. In one or more implementations, the depth prediction system 106 samples multiple pairs inside the planar region of the predicted depth map, such as (100, 500, 1000, 5000, or 10000 paired points). In alternative implementations, the depth prediction system 106 samples pairs from another type of predicted depth image, such as an inverse predicted depth map.

In addition, the depth prediction system 106 performs an act 724 of identifying a pair of normals from the ground truth depth image. For example, in some implementations, the depth prediction system 106 identifies and samples corresponding normal pairs in the ground truth normal based on the predicted normal map. Indeed, the depth prediction system 106 samples matching sets of normal pairs in both the predicted normal map and the ground truth normal map as much as possible.

As shown, FIG. 7B includes a sub-act 726 of the depth prediction system 106 determining the pair-wise normal loss by comparing the pairs of normals. In one or more implementations, the depth prediction system 106 determines the pair-wise normal loss by comparing the pair of normals in the predicted normal map (i.e., predicted depth image) and the pair of normals in the ground truth normal map (i.e., ground truth digital image). For example, the depth prediction system 106 enforces the normal regression loss between the normal pairs in the depth maps.

In various implementations, the depth prediction system 106 enforces the pair-wise normal loss in planar regions by comparing surface normal angles within each pair and between corresponding pairs. For example, in one or more implementations, for a pair of normals sampled from the predicted normal map, the depth prediction system 106 determines a first angle difference between the two normals. The depth prediction system 106 then determines a second angle difference between the corresponding normal pair from the ground truth normal map. Further, the depth prediction system 106 utilizes the disparity between the first angle difference and the second angle difference to determine the pair-wise normal loss.

In some implementations, the depth prediction system 106 averages the pair-wise normal losses determined for each set of normal pairs. For example, the depth prediction system 106 samples a number of pairs in both the predicted normal map and the ground truth normal map and determines a pair-wise normal loss for each set of pairs, as described above. The depth prediction system 106 then averages the pair-wise normal losses before combining the losses to planar regions with pair-wise normal losses from edges, as described in the act 742 below.

As shown in FIG. 7B, when the depth prediction system 106 detects an edge 730, the depth prediction system 106 performs the sub-acts 732-740. To illustrate, when an edge 730 is detected, the depth prediction system 106 performs an act 732 of sampling a pair of normals across the edge from the predicted normal map. For example, in various implementations, upon locating the edge 730, the depth prediction system 106 identifies and pairs a first surface normal on one side of the edge 730 with a second surface normal on the opposite side of the edge 730. The depth prediction system 106 may sample a number of pairs across the edge 730 in the predicted normal map.

As also shown, the depth prediction system 106 performs an act 734 of sampling a pair of normals across the edge from the ground truth normal map. For example, in one or more implementations, upon locating sampling a pair in the predicted normal map, the depth prediction system 106 identifies and samples a corresponding pair across the edge 730 in the ground truth normal map.

In one or more implementations, the depth prediction system 106 represents the sample pairs generally as $\mathcal{P} = \{(P_A, P_B)_i\} | i = \{0, \ldots, n\}$, where $P_A$ represents a first normal in a pair, $P_B$ represents a second normal in the pair, and n represents the total number of sample pairs. In these implementations, the depth prediction system 106 represents the sample pairs in the predicted normal map as $\mathcal{N} = \{(n_A, n_B)_i\} | i = \{0, \ldots, n\}$, where $n_A$ represents a first normal in a pair and $n_B$ represents a second normal in the pair in the predicted normal map. Additionally, the depth prediction system 106 represents the sample pairs in the ground truth normal map as $\mathcal{N}^* = \{(n^*_A, n^*_B)_i\} | i = \{0, \ldots, n\}$, where $n^*_A$ represents a first normal in a pair and $n^*_B$ represents a second normal in the pair in the ground truth normal map.

As shown, the depth prediction system 106 performs a sub-act 736 of determining a first angle between the pair of normals for the predicted normal map. For instance, in one or more implementations, for each of the sample pairs, the depth prediction system 106 compares the orthogonal direction of the normals in the pair and determines an angle between the two. As also shown, the depth prediction system 106 performs a sub-act 738 of determining a second angle between the pair of normals for the ground truth normal map. For example, in one or more implementations, the depth prediction system 106 determines the angle between the two surface normals in the pair, as described above.

FIG. 7B also includes the depth prediction system 106 performing a sub-act 740 of determining the pair-wise normal loss by comparing the first angle with the second angle. For example, in one or more implementations, the depth prediction system 106 determines the pair-wise normal loss based on an absolute value difference from each of the sample pairs between the predicted normal map and the ground truth normal map.

In a number of implementations, the sub-act 740 includes the depth prediction system 106 selecting a subset of sample pairs from the sample pairs (e.g., $\mathcal{L}$) for training the depth prediction model. To elaborate, because the ground truth depth image includes very precise depth data at a high level of granularity, the depth prediction system 106 can identify sharp edge boundaries in the image as well as where the edge begins to change into a plane. Indeed, the detailed depth data in the ground truth allows the depth prediction system 106 to increase the accuracy of the depth prediction model by keying in on differences at the local level rather than the more general global image level. Stated another way, the high-quality ground truth enables the depth prediction system 106 to more precisely identify differences between edges in the ground truth digital image and the predicted depth image, which can result in a more accurate and robust training of the depth prediction model. Accordingly, to identify these edge differences, in a number of implementations, the depth prediction system 106 identifies a subset of sample pairs that includes pairs located on the edge as well as near the edge in the ground truth digital image.

To further elaborate, in one or more implementations, the depth prediction system 106 identifies a subset of sample pairs that includes a set of positive edge sample pairs and a set of negative edge sample pairs from the sample pairs (e.g., $\mathcal{P}$). In these implementations, the positive edge samples are located on edge boundaries (e.g., the precise edge boundary) and the negative sample pairs are located on smoother portions slightly away from the edge boundary, but still near enough to the edge boundary to be considered belonging to the edge (e.g., where the edge boundary begins to fade into a plane). For example, the depth prediction system 106 determines that a sample pair is a positive edge sample if the sample pair has an angle that satisfies a first edge threshold (e.g., the angle is greater than arccos (0.3)).

In some implementations, the depth prediction system 106 determines that a sample pair is a negative edge sample if the sample pair has an angle that satisfies a second edge threshold (e.g., the angle is less than arccos (0.95)). In these implementations, the depth prediction system 106 includes negative edge samples to balance the training data such that the depth prediction model is trained to detect both sharp edges as well as areas where an edge is transitioning into a plane. Indeed, if only providing the depth prediction model with examples of sharp edge comparisons between ground truth depth images and predicted depth images, the depth prediction system 106 would create a less robust and accurate model having edge confusion.

To illustrate, in various implementations, including the above implementations, the depth prediction system 106 follows the sampling method shown below in Equation 4. In alternative implementations, the depth prediction system 106 utilizes different threshold values to determine the positive and negative edge samples.

$$S_1 = \{n^*_A \cdot n^*_A > 0.95, n^*_A \cdot n^*_A < 0.3 | (n^*_A \cdot n^*_A)_i \in \mathcal{N}^*\} \quad (4)$$

As shown, FIG. 7B includes the depth prediction system 106 performing an act 742 of combining the pair-wise normal loss for edges and planar regions. For example, in one or more implementations, the depth prediction system 106 utilizes the planar sample pairs as well as the edge sample pairs (all or the subset) to determine the pair-wise normal measure of loss. The depth prediction system 106 then, as described above, utilizes the loss measure to tune and train the depth prediction model.

In various implementations, the depth prediction system 106 regresses the angles between the sample pairs in the predicted depth image and the ground truth depth image to determine the pair-wise normal loss. To illustrate, in one or more implementations, the depth prediction system 106 follows the formulation in Equation 5 below to determine the combined pair-wise normal loss.

$$\mathcal{L}_{PWN} = \frac{1}{N} \sum_i^N |n_{Ai} \cdot n_{Bi} - n^*_{Ai} \cdot n^*_{Bi}| \quad (5)$$

As mentioned above, in some implementations, such as when using mid-quality ground truth digital image sets, the depth prediction system 106 only determines the pair-wise normal for planar regions. In these implementations, the ground truth depth data may not be granular enough to identify sharp edges and enforcing the pair-wise normal regression loss on the noisy edges could result in accurate artifacts. Thus, in these implementations, the depth prediction system 106 determines the pair-wise normal loss utilizing the sub-acts 718-726.

As mentioned above, by utilizing pair-wise normal loss, the depth prediction system 106 can generate depth images with improved accuracy. This improved accuracy is evidenced both qualitatively and quantitatively. To illustrate, FIG. 7C shows qualitative results that compare an example embodiment of the depth prediction system 106 using the pair-wise normal loss to example embodiments without using pair-wise normal loss. In particular, FIG. 7C includes input images 750, ground truth 3D point cloud depth images 752, depth images without PWN (pair-wise normal) loss 754, and depth images with PWN loss 756.

As shown, the depth prediction system 106 reconstructs 3D point cloud depth images with PWN loss (e.g., 756) and without PWN loss (e.g., 754) utilizing pair-wise normal loss. The depth images with PWN loss 756 show that the edges and planes are better reconstructed than the depth images without PWN loss 754. In particular, note the arrows in the depth images without PWN loss 754 show blurry and skewed edges along with collapsed planes. In contrast, the depth image images with PWN loss 756 show straighter edges and flat planes that better match the ground truth 3D point cloud depth images 752.

Along with the qualitative results shown in FIG. 7C, Table 3 below shows quantitative results. For context, researchers evaluated the quality of employing pair-wise normal loss by comparing an example embodiment of the depth prediction model with state-of-the-art models on a common data set (e.g., iBims-1).

TABLE 3

| Method | $\varepsilon_{DBE}^{acc} \downarrow$ | $\varepsilon_{DBE}^{comp} \downarrow$ | $\varepsilon_{PE}^{plan} \downarrow$ | $\varepsilon_{PE}^{orie} \downarrow$ | AbsRel$\downarrow$ |
|---|---|---|---|---|---|
| SGRL | 7.72 | 9.68 | 5.00 | 44.77 | 0.30 |
| MegaDepth | 4.09 | 8.28 | 7.04 | 33.03 | 0.20 |
| MiDaS | 1.91 | 5.72 | 3.43 | 12.78 | 0.104 |
| 3D Ken Burns | 2.02 | 5.44 | 2.19 | 10.24 | 0.097 |
| Depth Prediction Model w/o PWN | 2.05 | 6.10 | 3.91 | 13.47 | 0.106 |
| Depth Prediction Model with PWN | 1.90 | 5.73 | 2.0 | 7.41 | 0.079 |

As shown in Table 3, an example embodiment of the depth prediction model described herein outperforms prior work for this task. More specifically, Table 3 shows that the example embodiment of the depth prediction model described herein improves both edges and planes by adding pair-wise normal loss. In particular, Table 3 compares the quality of depth boundaries (DBE) and planes (PE) as well as the absolute relative error (AbsRel), where lower values indicate better results.

For context, the state-of-the-art models include Xian et al., *Structure-Guided Ranking Loss For Single Image Depth Prediction*, published on pages 611-620 of the Proceedings of IEEE Computer Society Conference on Computer Vision and Pattern Recognition, 2020 (i.e., "SGRL" in Table 3); MegaDepth (see Equation 1 above for reference); MiDaS (see Table 2 above for reference); and Simon et al., *3D Ken Burns Effect From A Single Image*, published in 38(6):184:1-184:15 of ACM Transactions on Graphics, 2019 (i.e., "3D Ken Burns" in Table 3).

As described above, the depth prediction system 106 can provide improved accuracy and performance over state-of-the-art models. Table 2 above shows quantitative improvements of one or more embodiments of the depth prediction system 106 with respect to image-level normalized regression loss. FIG. 7C shows qualitative improvements and Table 3 above shows quantitative improvements of one or more embodiments of the depth prediction system 106 with respect to pair-wise normal loss. Furthermore, researchers compared an example embodiment of the depth prediction model with both image-level normalized regression loss and pair-wise normal loss compared to state-of-the-art models. To illustrate, FIG. 8 shows qualitative results comparing one or more implementations of the depth prediction system with state-of-the-art systems.

Figure 8:
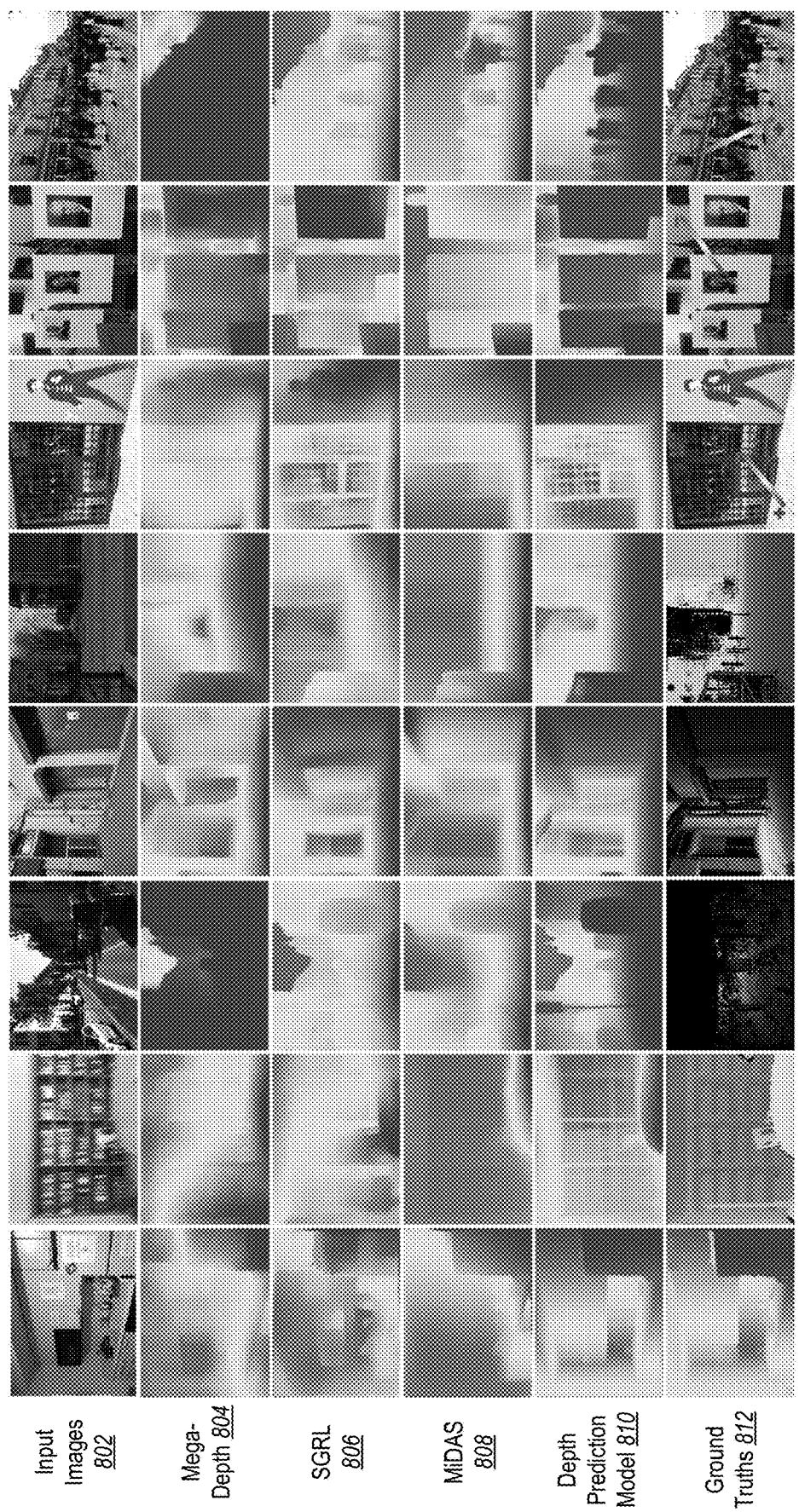
FIG. 8 illustrates qualitative results comparing one or more implementations of the depth prediction system with state-of-the-art systems.

As shown, FIG. 8 compares depth images (e.g., depth maps) generated by the various models including an example embodiment of the depth prediction model described herein. In particular, FIG. 8 includes input images 802 and corresponding ground truths 812. Additionally, FIG. 8 includes depth maps generated by the models MegaDepth 804, SGRL 806, and MiDaS 808 (see Table 3 for references to these models) as well as the depth prediction model 810 of the depth prediction system 106 described herein.

As shown in FIG. 8, utilizing the depth prediction model, the depth prediction system 106 can predict more accurate depths at deeper-depth locations as well as in regions with complex details than the other models. In addition, the depth prediction model better generalizes on in-the-wild scenes. Table 4 below provides corresponding quantitative results.

TABLE 4

| Method | Backbone | OASIS WHDR↓ | YT3D WHDR↓ | NYU AbsRel↓ | NYU δ₁↑ | KITTI AbsRel↓ | KITTI δ₁↑ | DIODE AbsRel↓ | DIODE δ₁↑ | ScanNet AbsRel↓ | ScanNet δ₁↑ | Rank |
|---|---|---|---|---|---|---|---|---|---|---|---|---|
| MegaDepth | Hourglass | 33.5 | 26.7 | 19.4 | 71.4 | 20.1 | 66.3 | 39.1 | 61.5 | 19.0 | 71.2 | 6.7 |
| SGRL | ResNet50 | 31.6 | 23.0 | 16.6 | 77.2 | 27.0 | 52.9 | 42.5 | 61.8 | 17.4 | 75.9 | 6.7 |
| MiDaS | ResNeXt101 | 29.5 | 19.9 | 11.1 | 88.5 | 23.6 | 63.0 | 33.2 | 71.5 | 11.1 | 88.6 | 3.5 |
| Depth Prediction Model | ResNet50 | 30.2 | 19.5 | 9.1 | 91.4 | 14.3 | 80.0 | 28.7 | 75.1 | 9.6 | 90.8 | 1.9 |
| Depth Prediction Model | ResNeXt101 | 28.3 | 19.2 | 91.6 | 91.6 | 14.9 | 78.4 | 27.1 | 76.6 | 9.5 | 91.2 | 1.1 |

As shown, Table 4 provides a quantitative comparison of an example implementation of the depth prediction model to various state-of-the-art methods based on multiple eight zero-shot datasets unseen during training. As shown, the implementation of depth prediction model of the depth prediction system 106 can achieve better performance than existing state-of-the-art methods across all test datasets. Further, as shown in Table 4, using a largerResNeXt101 backbone further improves the results of the depth prediction model in some implementations.

Figure 9:
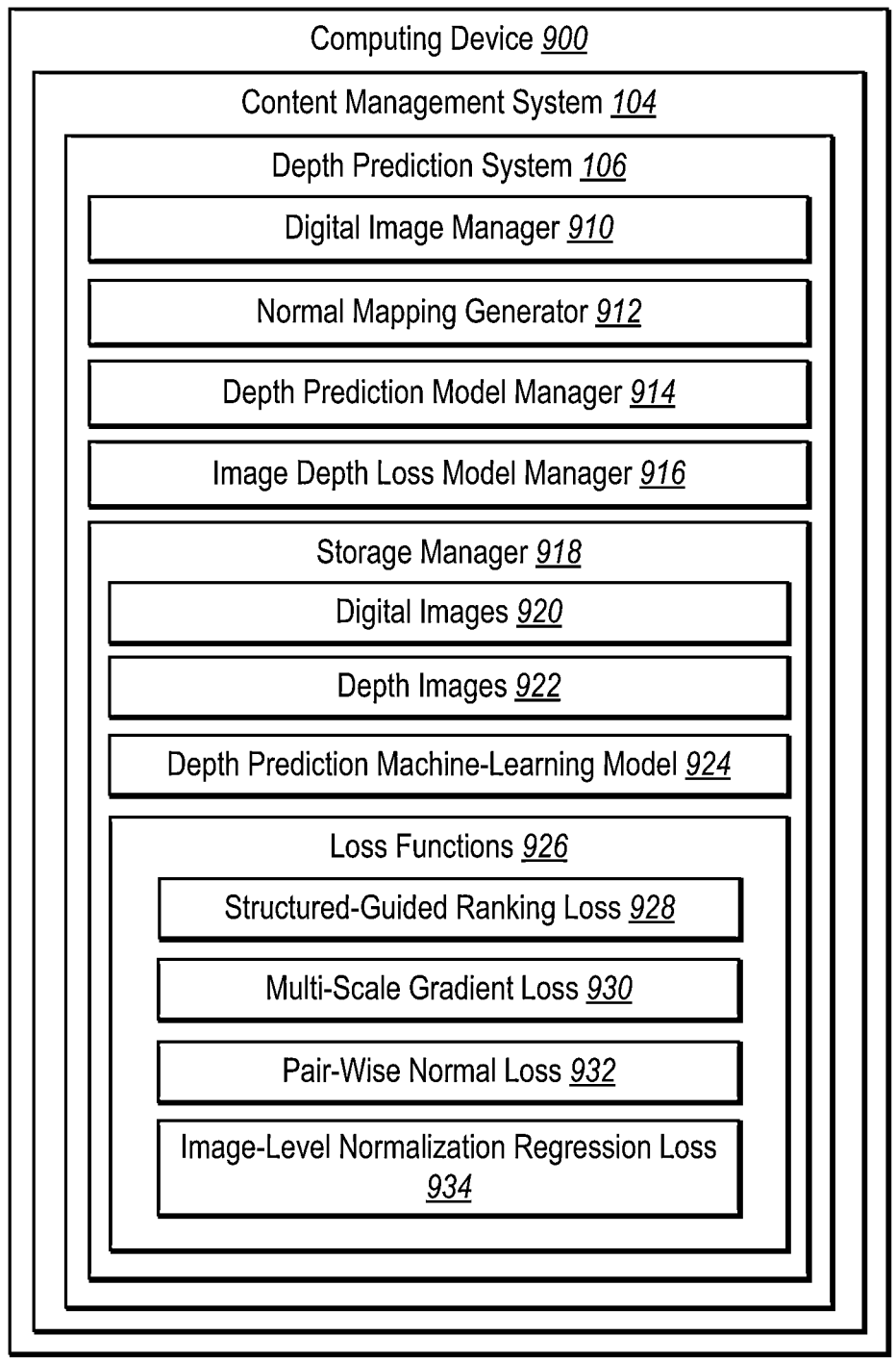
FIG. 9 illustrates a schematic diagram of the depth prediction system in accordance with one or more implementations.

Referring now to FIG. 9, additional detail is provided regarding the capabilities and components of a depth prediction system 106 in accordance with one or more implementations. In particular, FIG. 9 shows a schematic diagram of an example architecture of the depth prediction system 106 implemented within a content management system 104 and hosted on a computing device 900.

In addition, the computing device 900 may represent various types of computing devices (e.g., the server device 102 and/or the client device 108). For example, in one or more implementations, the computing device 900 is a non-mobile computing device, such as a server, a cluster of servers, a desktop, or another type of non-mobile computing device. In some implementations, the computing device 900 is a mobile computing device, such as a laptop, a tablet, a mobile telephone, a smartphone, a wearable device, or a device connected to the internet. Additional details with regard to the computing device 900 are discussed below with respect to FIG. 13.

As shown, the computing device 900 includes the content management system 104, which is described above, and the depth prediction system 106. The depth prediction system 106 includes various components for performing the processes and features described herein. To illustrate, the depth prediction system 106 includes a digital image manager 910, a normal mapping generator 912, a depth prediction model manager 914, an image depth loss model manager 916, and a storage manager 918. As shown, the storage manager 918 includes digital images 920, depth images 922, a depth prediction machine-learning model 924, and loss functions 926, which include structured-guided ranking loss 928, multi-scale gradient loss 930, pair-wise normal loss 932, and image-level normalized regression loss 934.

As mentioned above, the depth prediction system 106 includes the digital image manager 910. In general, the digital image manager 910 facilitates identifying, accessing, receiving, obtaining, generating, importing, exporting, copying, modifying, removing, providing, and organizing images. In some implementations, the digital image manager 910 communicates with the storage manager 918 to store and retrieve the digital images 920 and/or depth images 922, for example, within a digital image database managed by the storage manager 918.

As shown, the depth prediction system 106 includes the normal mapping generator 912. In one or more implementations, the normal mapping generator 912 maps digital images 920, including ground truth depth images into normal maps (e.g., a ground truth normal map). For example, the normal mapping generator 912 generates orthogonal normal vectors that represent depth metrics in a digital image. In some implementations, the normal mapping generator 912 generates a normal map from a three-dimensional point cloud. In various implementations, the normal mapping generator 912 generates a normal map from a depth map, as described above.

As shown, the depth prediction system 106 includes the depth prediction model manager 914. In various implementations, the depth prediction model manager 914 maintains, creates, generates, trains, updates, accesses, and/or utilizes the depth prediction models disclosed herein. For example, the depth prediction model manager 914 trains and tunes a depth prediction model (i.e., a depth prediction machine-learning model 924) to generate depth images, such as depth maps and inverse depth maps. Further, the depth prediction model manager 914 adds robustness and accuracy to the depth prediction model utilizing various loss functions, as described above.

As shown, the depth prediction system 106 includes the image depth loss model manager 916. In one or more implementations, the image depth loss model manager 916 maintains, creates, generates, executes, updates, accesses, and/or utilizes loss functions, included one or more of the loss functions 926. In some implementations, the image depth loss model manager 916 creates loss function sets that include a combination of one or more loss functions, which is applied to a predicted depth image during the training of the depth prediction model, as described above. Indeed, the image depth loss model manager 916 generates a set of loss functions that includes the structured-guided ranking loss 928, the multi-scale gradient loss 930, the pair-wise normal loss 932, the image-level normalized regression loss 934, and/or additional loss functions.

Each of the components 910-934 of the depth prediction system 106 may include software, hardware, or both. For example, the components 910-934 may include one or more instructions stored on a computer-readable storage medium and executable by processors of one or more computing devices, such as a client device (e.g., a mobile client device) or server device. When executed by the processors, the computer-executable instructions of the depth prediction system 106 may cause a computing device to perform the feature learning methods described herein. Alternatively, the components 910-934 may include hardware, such as a special-purpose processing device to perform a certain function or group of functions. In addition, the components 910-934 of the depth prediction system 106 may include a combination of computer-executable instructions and hardware.

Furthermore, the components 910-934 of the depth prediction system 106 may be implemented as one or more operating systems, as one or more stand-alone applications, as one or more modules of an application, as one or more plug-ins, as one or more library functions or functions that may be called by other applications, and/or as a cloud-computing model. Thus, the components 910-934 may be implemented as a stand-alone application, such as a desktop or mobile application. Additionally, the components 910-934 may be implemented as one or more web-based applications hosted on a remote server. The components 910-934 may also be implemented in a suite of mobile device applications or "apps." To illustrate, the components 910-934 may be implemented in an application, including but not limited to ADOBE PHOTOSHOP, ADOBE CREATIVE CLOUD, LIGHTROOM, PHOTOSHOP ELEMENTS, PHOTOSHOP EXPRESS, PHOTOSHOP MOBILE, or other digital content applications or software packages. The foregoing are either registered trademarks or trademarks of Adobe Inc. in the United States and/or other countries.

FIGS. 1-9, the corresponding text, and the examples provide several different methods, systems, devices, and non-transitory computer-readable media of the depth prediction system 106. In addition to the foregoing, one or more implementations may also be described in terms of flowcharts comprising acts for accomplishing a particular result, such as the flowcharts of acts shown in FIGS. 10-12. Additionally, the acts described herein may be repeated or performed in parallel with one another or parallel with different instances of the same or similar acts.

Figure 12:
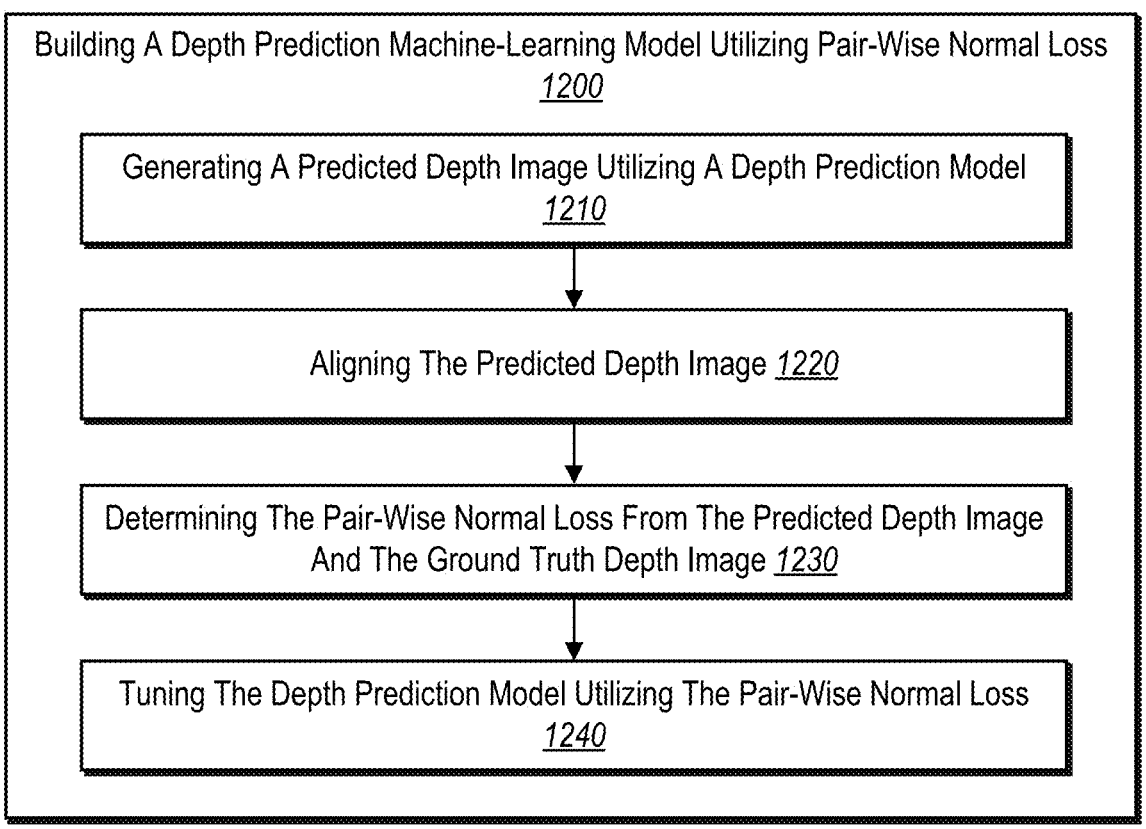
FIG. 12 illustrates a flowchart of a series of acts for building a depth prediction machine-learning model utilizing pair-wise normal loss in accordance with one or more implementations.

While FIGS. 10-12 illustrate acts according to one or more implementations, alternative implementations may omit, add to, reorder, and/or modify any of the acts shown in FIGS. 10-12. The acts of FIGS. 10-12 may be performed as part of methods. Alternatively, non-transitory computer-readable mediums may comprise instructions that, when executed by one or more processors, cause a computing device to perform the acts of FIGS. 10-12. In some implementations, one or more systems may perform the acts of FIGS. 10-12.

In one or more implementations, the series of acts are implemented on one or more computing devices, such as the server device 102, the client device 108, or the computing device 900. In addition, in some implementations, the series of acts are implemented in a digital medium environment for editing digital images. For example, the series of acts are implemented on a computing device having memory that includes a set of ground truth digital images having a digital image and a ground truth depth image.

As mentioned previously, FIG. 10 illustrates a flowchart of a series of acts 1000 of generating depth images utilizing depth prediction machine-learning models in accordance with one or more implementations. The series of acts 1000 includes an act 1010 of generating a first set of predicted depth images and a second set of predicted depth images from different sources. In particular, the act 1010 may involve generating, utilizing the depth prediction machine-learning model, a first set of predicted depth images from a first set of ground truth digital images having a first source and a second set of predicted depth images from a second set of ground truth digital images having a second source.

In one or more implementations, the act 1010 includes generating the first set of predicted depth images by generating a set of depth maps via a first output path of the depth prediction machine-learning model. In some implementations, the act 1010 also includes generating the second set of predicted depth images by generating a set of inverse depth maps via a second output path of the depth prediction machine-learning model. In various implementations, the first set of ground truth digital images includes a first set of digital images and a set of ground truth depth maps, and the second set of ground truth digital images includes a second set of digital images and a set of ground truth inverse depth maps.

As shown, the series of acts 1000 also includes an act 1020 of determining a first measure of loss utilizing a first loss function. In particular, the act 1020 may involve determining a first measure of loss from the first set of predicted depth images utilizing a first loss function. In a number of implementations, the act 1020 includes utilizing an image-level normalized regression loss function or a pair-wise normal loss function. In some implementations, the first set of ground truth digital images having the first source includes LiDAR depth data having scale and shift measurements. Further, in one or more implementations, the act 1020 includes determining a pair-wise normal loss from the first set of predicted depth images by utilizing a pair-wise normal loss function to compare depth data in the first set of predicted depth images to the LiDAR depth data from the ground truth depth images of the first set of ground truth digital images. In example implementations, the act 1020 includes determining the first measure of loss by comparing the set of depth maps to the set of ground truth depth maps from the first set of ground truth digital images utilizing the first loss function.

As shown, the series of acts 1000 also includes an act 1030 of determining a second measure of loss utilizing a second loss. In particular, the act 1030 may involve determining a second measure of loss from the second set of predicted depth images utilizing a second loss function that differs from the first loss function. In some implementations, the act 1030 includes utilizing a set of loss functions that includes the image-level normalized regression loss function, the pair-wise normal loss function, and/or a multi-scale gradient loss function. In one or more implementations, the second set of ground truth digital images having the second source includes calibrated stereo-image-based depth data.

Further, in various implementations, the act 1030 includes determining an image-level normalized regression loss from the second set of predicted depth images by utilizing an image-level normalized regression loss function to compare depth data in the second set of predicted depth images to the stereo-image-based depth data from the ground truth depth images of the second set of ground truth digital images. In example implementations, the act 1030 includes determining the second measure of loss by comparing the set of inverse depth maps to the set of ground truth inverse depth maps from the second set of ground truth digital images utilizing the second loss function.

As shown, the series of acts 1000 also includes an act 1040 of tuning the depth prediction learning model utilizing the measure of losses. In particular, the act 1040 may involve tuning the depth prediction machine-learning model utilizing the first measure of loss and the second measure of loss. In one or more implementations, the act 1040 includes an act of utilizing backpropagation to tune the depth prediction machine-learning model based on a combination of the first measure of loss and the second measure of loss.

The series of acts 1000 may include various additional acts. For example, the series of acts 1000 may include acts of identifying a query digital image and generating a depth map from the query digital image utilizing the depth prediction machine-learning model. In some implementations, the series of acts 1000 includes an act of building the depth prediction machine-learning model by generating a third set of predicted depth images from a third set of ground truth digital images having a third source utilizing the depth prediction machine-learning model, where the third set of ground truth digital images includes uncalibrated stereo-image-based depth data generated at the third source; determining a third measure of loss from the third set of predicted depth images utilizing a third loss function that determines a structure-guided ranking loss by comparing the third set of predicted depth images to the third set of ground truth digital images; and tuning the depth prediction machine-learning model utilizing the third measure of loss.

As mentioned previously, FIG. 11 illustrates a flowchart of a series of acts 1100 of building a depth prediction machine-learning model utilizing an image-level normalized regression loss in accordance with one or more implementations. The series of acts 1100 includes an act 1110 of normalizing a ground truth depth image. In particular, the act 1110 may involve normalizing a ground truth depth image to generate a normalized ground truth depth image.

In one or more implementations, the act 1110 includes generating the normalized ground truth depth image by utilizing a hyperbolic tangent function. In one or more implementations, the act 1110 includes receiving a first set of ground truth digital images having a first source and a second set of ground truth digital images having a second source; detecting depth range differences between the first set of ground truth digital images and the second set of ground truth digital images; normalizing the first set of ground truth digital images to a target numerical range; and normalizing the second set of ground truth digital images to the target numerical range.

As shown, the series of acts 1100 also includes an act 1120 of trimming the normalized ground truth depth image. In particular, the act 1120 may involve trimming the normalized ground truth depth image by removing outlier pixels from the normalized ground truth depth image to generate a trimmed ground truth depth image. In a number of implementations, the act 1120 includes generating the trimmed ground truth depth image by removing outlier pixels from the normalized ground truth depth image utilizing statistical-based trimming.

As shown, the series of acts 1100 also includes an act 1130 of generating a predicted depth image from a digital image. In particular, the act 1130 may involve generating a predicted depth image utilizing the depth prediction machine-learning model from a digital image corresponding to the ground truth depth image.

As also shown, the series of acts 1100 also includes an act 1140 of generating image-level normalized regression loss based on the trimmed ground truth depth image and the predicted depth image. In particular, the act 1140 may involve determining the image-level normalized regression loss by generating a pixel-wise error between the trimmed ground truth depth image and the predicted depth image. In one or more implementations, the act 1140 includes utilizing the depth prediction machine-learning model to determine a first measure of loss from the normalized first set of ground truth digital images utilizing a first set of loss functions including the image-level normalized regression loss and utilizing the depth prediction machine-learning model to determine a second measure of loss from the normalized second set of ground truth digital images utilizing a second set of loss functions that is different from the first set of loss functions.

As shown, the series of acts 1100 also includes an act 1150 of tuning the depth prediction model utilizing the image-level normalized regression loss. In particular, the act 1150 may involve tuning the depth prediction machine-learning model utilizing the image-level normalized regression loss determined between a predicted depth image and a corresponding ground truth depth image.

As mentioned previously, FIG. 12 illustrates a flowchart of a series of acts 1200 of building a depth prediction machine-learning model utilizing pair-wise normal loss in accordance with one or more implementations. The series of acts 1200 includes an act 1210 of generating a predicted depth image utilizing a depth prediction model. In particular, the act 1210 may involve generating a predicted depth image from a digital image utilizing a depth prediction machine-learning model. In one or more implementations, the act 1210 includes generating the normals for the ground truth depth image from a three-dimensional point cloud of the ground truth depth image utilizing least-square fitting or another fitting approach.

As shown, the series of acts 1200 also includes an act 1220 of aligning the predicted depth image with a ground truth depth image. In particular, the act 1220 may involve aligning the predicted depth image with the scale and shift depth factors from the ground truth depth image.

As shown, the series of acts 1200 also includes an act 1230 of determining the pair-wise normal loss from the predicted depth image and the ground truth depth image. In particular, the act 1230 may involve determining the pair-wise normal loss by comparing normals from the predicted depth image to normals from the ground truth depth image. In various implementations, the act 1230 includes receiving a first set of ground truth digital images having a first source including LiDAR depth data having scale and shift measurements; and utilizing the depth prediction machine-learning model to determine the pair-wise normal loss for planar regions and edges in the first set of ground truth digital images.

In one or more implementations, the act 1230 includes determining a planar region based on normals of the predicted depth image or normals of the ground truth depth image, identifying a first pair of normals from the predicted depth image within the planar region, and a second pair of normals from the ground truth depth image within the planar region; and determining the pair-wise normal loss by comparing the first pair of normals and the second pair of normals. In some implementations, the act 1230 includes identifying an edge based on normals of the predicted depth image or normal of the ground truth depth image, sampling a first pair of normals from the predicted depth image based on the edge and a second pair of normals from the ground truth depth image based on the edge, determining a first angle between the first pair of normals from the predicted depth image and a second angle between the second pair of normals from the ground truth depth image, and determining the pair-wise normal loss by comparing the first angle and the second angle.

As also shown, the series of acts 1200 also includes an act 1240 of tuning the depth prediction model utilizing the pair-wise normal loss. In particular, the act 1240 may involve tuning the depth prediction machine-learning model utilizing the pair-wise normal loss. In one or more implementations, the act 1240 includes building the depth prediction machine-learning model utilizing the pair-wise normal loss, an image-level normalized regression loss, and a multi-scale gradient loss.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the depth prediction system to generate and utilize the depth prediction model, as described herein.

Implementations of the present disclosure may comprise or utilize a special-purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

The computer-readable media may be any available media that is accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure may comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media may include a network and/or data links that are used to carry desired program code means in the form of computer-executable instructions or data structures and that are accessed by a general-purpose or special-purpose computer. Combinations of the above should also be included within the scope of computer-readable media.

Further, upon reaching various computer system components, program code means in the form of computer-executable instructions or data structures may be transferred automatically from transmission media to non-transitory computer-readable storage media (devices) (or vice versa). For example, computer-executable instructions or data structures received over a network or data link may be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) may be included in computer system components that also (or even primarily) utilize transmission media.

Computer-executable instructions comprise, for example, instructions and data which, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure may also be implemented in cloud computing environments. As used herein, the term "cloud computing" refers to a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud-computing model may be composed of various characteristics such as, for example, on-demand self-service, broad network access, resource pooling, rapid elasticity, measured service, and so forth. A cloud-computing model may also expose various service models, such as, for example, Software as a Service ("SaaS"), Platform as a Service ("PaaS"), and Infrastructure as a Service ("IaaS"). A cloud-computing model may also be deployed using different deployment models such as private cloud, community cloud, public cloud, hybrid cloud, and so forth. In addition, as used herein, the term "cloud-computing environment" refers to an environment in which cloud computing is employed.

Figure 13:
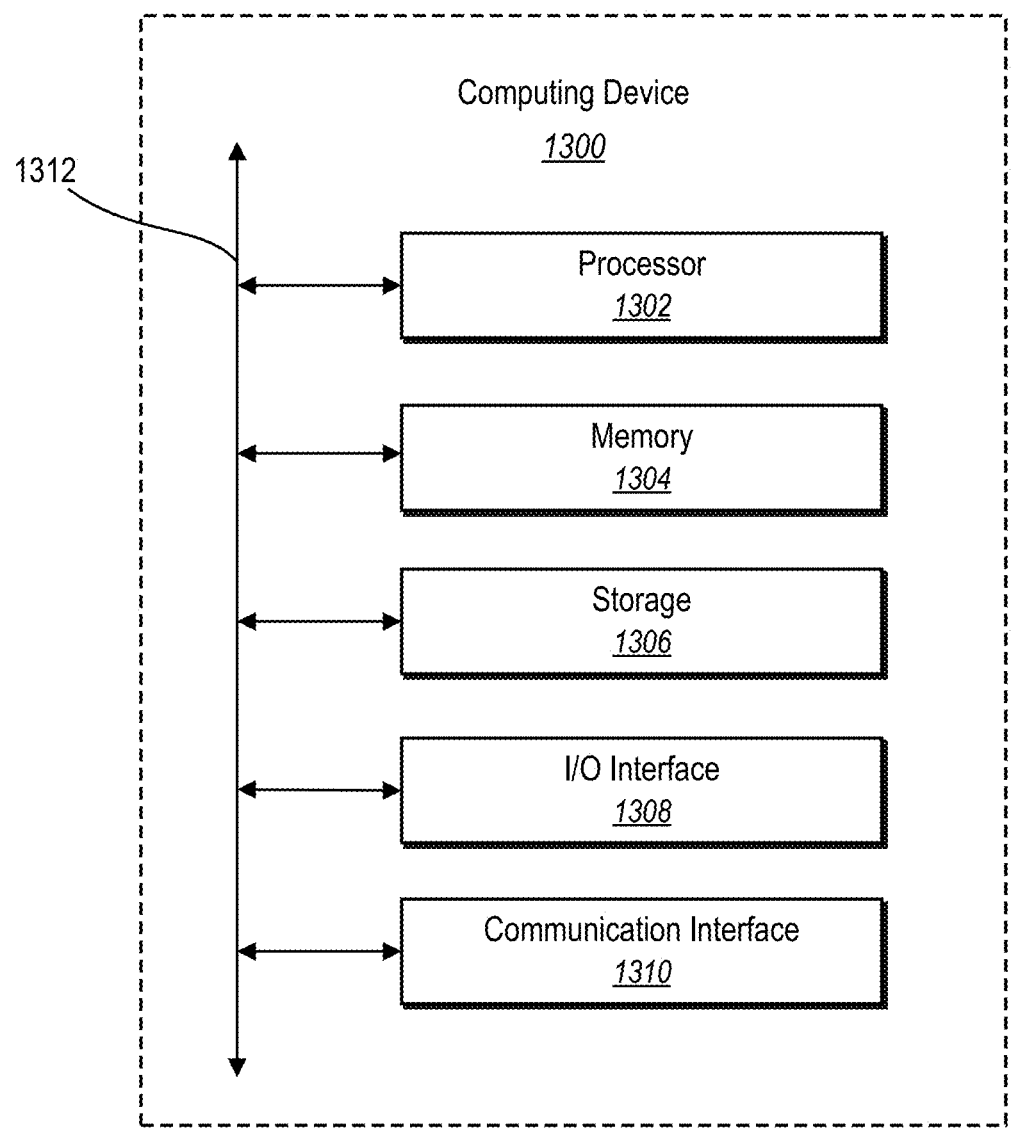
FIG. 13 illustrates a block diagram of an example computing device for implementing one or more implementations of the present disclosure.

FIG. 13 illustrates a block diagram of an example computing device 1300 that may be configured to perform one or more of the processes described above. One will appreciate that one or more computing devices, such as server device 102, the client device 108, or the computing device 900. In one or more implementations, the computing device 1300 may be a non-mobile device (e.g., a desktop computer, a server device, a web server, a file server, a social networking system, a program server, an application store, or a content provider). Further, the computing device 1300 may be a server device that includes cloud-based processing and storage capabilities. In some implementations, the computing device 1300 may be a mobile device (e.g., a laptop, a tablet, a smartphone, a mobile telephone, a camera, a tracker, a watch, a wearable device, etc.).

As shown in FIG. 13, the computing device 1300 may include one or more processor(s) 1302, memory 1304, a storage device 1306, input/output ("I/O") interfaces 1308, and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other implementations. Furthermore, in certain implementations, the computing device 1300 includes fewer components than those shown in FIG. 13. Components of the computing device 1300 shown in FIG. 13 will now be described in additional detail.

In particular implementations, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include volatile and/or non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 may include a non-transitory storage medium described above. The storage device 1306 may include a hard disk drive (HDD), flash memory, a Universal Serial Bus (USB) drive, or a combination of these or other storage devices.

As shown, the computing device 1300 includes one or more I/O interfaces 1308, which are provided to allow a user to provide input to (e.g., user strokes), receive output from, and otherwise transfer data to and from the computing device 1300. These I/O interfaces 1308 may include a mouse, keypad or a keyboard, a touch screen, camera, optical scanner, network interface, modem, other known I/O devices, or a combination of these I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1308 are configured to provide graphical data to a display for presentation to a user. The graphical data may be representative of one or more graphical user interfaces and/or any other graphical content as may serve a particular implementation.

The computing device 1300 may further include a communication interface 1310. The communication interface 1310 may include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 may further include a bus 1312. The bus 1312 may include hardware, software, or both that connects components of computing device 1300 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
generating, utilizing a depth prediction machine-learning model, a first set of predicted depth images from a first set of ground truth digital images having a first source and a second set of predicted depth images from a second set of ground truth digital images having a second source;
determining a first measure of loss from the first set of predicted depth images utilizing a first loss function by utilizing an image-level normalized regression loss function or a pair-wise normal loss function;
determining a second measure of loss from the second set of predicted depth images utilizing a second loss function that differs from the first loss function; and
tuning the depth prediction machine-learning model utilizing the first measure of loss and the second measure of loss.

2. The method of claim 1, further comprising:
generating the first set of predicted depth images by generating a set of depth maps via a first output path of the depth prediction machine-learning model; and
generating the second set of predicted depth images by generating a set of inverse depth maps via a second output path of the depth prediction machine-learning model.

3. The method of claim 2, wherein the first set of ground truth digital images comprises a first set of digital images and a set of ground truth depth maps, and wherein the second set of ground truth digital images comprises a second set of digital images and a set of ground truth inverse depth maps; and
further comprising:
determining the first measure of loss by comparing the set of depth maps to the set of ground truth depth maps from the first set of ground truth digital images utilizing the first loss function; and
determining the second measure of loss by comparing the set of inverse depth maps to the set of ground truth inverse depth maps from the second set of ground truth digital images utilizing the second loss function.

4. The method of claim 1, further comprising generating the first measure of loss utilizing the first loss function by utilizing an image-level normalized regression loss function that transforms the first set of ground truth digital images into a common depth space.

5. The method of claim 1, further comprising generating the second measure of loss utilizing a set of loss functions comprising the image-level normalized regression loss function, the pair-wise normal loss function, and a multi-scale gradient loss function.

6. The method of claim 1, wherein the first set of ground truth digital images having the first source comprises LiDAR depth data having scale and shift measurements; and
further comprising determining a pair-wise normal loss from the first set of predicted depth images by utilizing a pair-wise normal loss function to compare depth data in the first set of predicted depth images to the LiDAR depth data from the first set of ground truth digital images of the first set of ground truth digital images.

7. The method of claim 1, wherein the second set of ground truth digital images having the second source comprises calibrated stereo-image-based depth data; and
further comprising determining an image-level normalized regression loss from the second set of predicted depth images by utilizing an image-level normalized regression loss function to compare depth data in the second set of predicted depth images to the calibrated stereo-image-based depth data from the second set of ground truth digital images of the second set of ground truth digital images.

8. The method of claim 1, further comprising building the depth prediction machine-learning model by:
generating, utilizing the depth prediction machine-learning model, a third set of predicted depth images from a third set of ground truth digital images having a third source, wherein the third set of ground truth digital images comprises uncalibrated stereo-image-based depth data generated at the third source;
determining a third measure of loss from the third set of predicted depth images utilizing a third loss function that determines a structure-guided ranking loss by comparing the third set of predicted depth images to the third set of ground truth digital images; and
tuning the depth prediction machine-learning model utilizing the third measure of loss.

9. The method of claim 1, further comprising:
identifying a query digital image; and
generating a depth map from the query digital image utilizing the depth prediction machine-learning model.

10. A system comprising:
a memory component; and
one or more processing devices coupled to the memory component, the one or more processing devices to perform operations comprising:
generating, utilizing a depth prediction machine-learning model, a first set of predicted depth images from a first set of ground truth digital images having a first source and a second set of predicted depth images from a second set of ground truth digital images having a second source;
determining a first measure of loss from the first set of predicted depth images utilizing a first loss function by utilizing an image-level normalized regression loss function or a pair-wise normal loss function;
determining a second measure of loss from the second set of predicted depth images utilizing a second loss function that differs from the first loss function; and
tuning the depth prediction machine-learning model utilizing the first measure of loss and the second measure of loss.

11. The system of claim 10, wherein the operations further comprise:
generating the first set of predicted depth images by generating a set of depth maps via a first output path of the depth prediction machine-learning model; and
generating the second set of predicted depth images by generating a set of inverse depth maps via a second output path of the depth prediction machine-learning model.

12. The system of claim 11, wherein the first set of ground truth digital images comprises a first set of digital images and a set of ground truth depth maps, and wherein the second set of ground truth digital images comprises a second set of digital images and a set of ground truth inverse depth maps; and
further comprising:
determining the first measure of loss by comparing the set of depth maps to the set of ground truth depth maps from the first set of ground truth digital images utilizing the first loss function; and
determining the second measure of loss by comparing the set of inverse depth maps to the set of ground truth inverse depth maps from the second set of ground truth digital images utilizing the second loss function.

13. The system of claim 10, wherein the operations further comprise generating the second measure of loss utilizing a set of loss functions comprising the image-level normalized regression loss function, the pair-wise normal loss function, and a multi-scale gradient loss function.

14. The system of claim 10, wherein the first set of ground truth digital images having the first source comprises LiDAR depth data having scale and shift measurements; and
further comprising determining a pair-wise normal loss from the first set of predicted depth images by utilizing a pair-wise normal loss function to compare depth data in the first set of predicted depth images to the LiDAR depth data from the first set of ground truth digital images of the first set of ground truth digital images.

15. The system of claim 10, wherein the second set of ground truth digital images having the second source comprises calibrated stereo-image-based depth data; and further comprising determining an image-level normalized regression loss from the second set of predicted depth images by utilizing an image-level normalized regression loss function to compare depth data in the second set of predicted depth images to the calibrated stereo-image-based depth data from the second set of ground truth digital images of the second set of ground truth digital images.

16. The system of claim 10, wherein the operations further comprise:

identifying a query digital image; and generating a depth map from the query digital image utilizing the depth prediction machine-learning model.

17. A non-transitory computer readable medium storing executable instructions which, when executed by a processing device, cause the processing device to perform operations comprising:

generating, utilizing a depth prediction machine-learning model, a first set of predicted depth images from a first set of ground truth digital images having a first source and a second set of predicted depth images from a second set of ground truth digital images having a second source;

determining a first measure of loss from the first set of predicted depth images utilizing a first loss function by utilizing an image-level normalized regression loss function or a pair-wise normal loss function;

determining a second measure of loss from the second set of predicted depth images utilizing a second loss function that differs from the first loss function; and tuning the depth prediction machine-learning model utilizing the first measure of loss and the second measure of loss.

18. The non-transitory computer readable medium of claim 17, wherein the operations further comprise generating the second measure of loss utilizing a set of loss functions comprising the image-level normalized regression loss function, the pair-wise normal loss function, and a multi-scale gradient loss function.

19. The non-transitory computer readable medium of claim 17, wherein the operations further comprise:

identifying a query digital image; and generating a depth map from the query digital image utilizing the depth prediction machine-learning model.

* * * * *